United States Patent
Shirokane et al.

(10) Patent No.: US 12,497,524 B2
(45) Date of Patent: Dec. 16, 2025

(54) INK FOR IMPERMEABLE BASE MATERIAL AND IMAGE RECORDING METHOD

(71) Applicant: FUJIFILM Corporation, Tokyo (JP)

(72) Inventors: Kenji Shirokane, Kanagawa (JP); Ayato Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 777 days.

(21) Appl. No.: 17/582,775

(22) Filed: Jan. 24, 2022

(65) Prior Publication Data

US 2022/0186056 A1 Jun. 16, 2022

Related U.S. Application Data

(63) Continuation of application No. PCT/JP2020/021915, filed on Jun. 3, 2020.

(30) Foreign Application Priority Data

Jul. 25, 2019 (JP) .................. 2019-136999

(51) Int. Cl.
| | |
|---|---|
| C09D 11/107 | (2014.01) |
| B41M 5/00 | (2006.01) |
| C08F 220/18 | (2006.01) |
| C09D 11/033 | (2014.01) |
| C09D 11/037 | (2014.01) |
| C09D 11/30 | (2014.01) |

(52) U.S. Cl.
CPC ......... *C09D 11/107* (2013.01); *B41M 5/0023* (2013.01); *C08F 220/1807* (2020.02); *C09D 11/033* (2013.01); *C09D 11/037* (2013.01); *C09D 11/30* (2013.01)

(58) Field of Classification Search
None
See application file for complete search history.

(56) References Cited

U.S. PATENT DOCUMENTS

| | | |
|---|---|---|
| 2004/0244622 A1 | 12/2004 | Ichinose et al. |
| 2010/0285221 A1 | 11/2010 | Oki et al. |
| 2012/0033011 A1 | 2/2012 | Ohya et al. |
| 2012/0038725 A1 | 2/2012 | Ohya et al. |
| 2013/0070036 A1 | 3/2013 | Ooishi |
| 2013/0208045 A1 | 8/2013 | Shimohara et al. |
| 2017/0355868 A1 | 12/2017 | Saiga et al. |
| 2019/0010349 A1 | 1/2019 | Shimono et al. |
| 2020/0248012 A1 | 8/2020 | Suzuki et al. |

(Continued)

FOREIGN PATENT DOCUMENTS

| | | |
|---|---|---|
| EP | 2484729 A1 | 8/2012 |
| JP | 2006-241193 A | 9/2006 |

(Continued)

OTHER PUBLICATIONS

Extended European Search Report dated Aug. 9, 2022 in Application No. 20843906.7.
Office Action issued Oct. 4, 2022 in Japanese Application No. 2021-534580.
Office Action issued Sep. 13, 2022 in Chinese Application No. 202080053165.9.
European Office Action issued Jun. 19, 2023 in Application No. 20843906.7.
International Search Report dated Sep. 1, 2020 issued by the International Searching Authority in Application No. PCT/JP2020/021915.
International Preliminary Report on Patentability dated Jan. 25, 2022 issued by The International Bureau of WIPO in Application No. PCT/JP2020/021915.

(Continued)

*Primary Examiner* — David J Buttner
(74) *Attorney, Agent, or Firm* — Sughrue Mion, PLLC

(57) ABSTRACT

Provided are an ink for an impermeable base material, including an aqueous medium and resin particles, in which a resin of the resin particles has a glass transition temperature of $-40°$ C. or higher and $85°$ C. or lower, the resin has at least one selected from the group consisting of a unit (1) to a unit (3), and at least one of an acid group or a salt of the acid group, an acid value of the resin is 0.10 mmol/g or greater and 2.65 mmol/g or less, and a proportion of a solvent having a boiling point of $250°$ C. or higher in the aqueous medium is 3% by mass or less, and an image recording method. $R^2$ represents a hydrogen atom or a C1 to C4 alkyl group, $A^2$ represents —NH— or —N($L^4$-$Y^4$)—, $L^2$ and $L^4$ represent a divalent group or a single bond, $L^3$ represents a divalent group, and $Y^2$ to $Y^4$ represent a monovalent group.

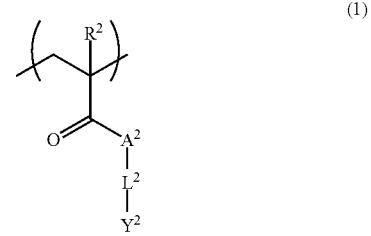

(1)

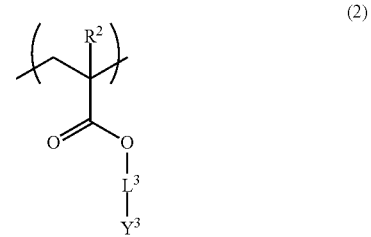

(2)

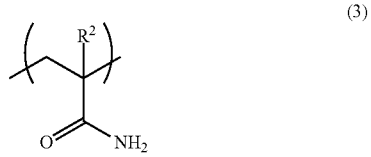

(3)

10 Claims, No Drawings

(56) References Cited

U.S. PATENT DOCUMENTS

| | | | |
|---|---|---|---|
| 2020/0354595 A1 | 11/2020 | Kobayashi et al. | |
| 2020/0377750 A1* | 12/2020 | Yatake | C09D 11/54 |

FOREIGN PATENT DOCUMENTS

| | | | |
|---|---|---|---|
| JP | 2007-253359 A | | 10/2007 |
| JP | 2010-023266 A | | 2/2010 |
| JP | 2010-155907 A | | 7/2010 |
| JP | 2012-177072 A | | 9/2012 |
| JP | 2013-064074 A | | 4/2013 |
| JP | 2013-163788 A | | 8/2013 |
| JP | 2013-193288 A | | 9/2013 |
| JP | 2016-069583 A | | 5/2016 |
| JP | 2017-013349 A | | 1/2017 |
| JP | 2017-105951 A | | 6/2017 |
| JP | 2017-222833 A | | 12/2017 |
| JP | 2018-177828 A | | 11/2018 |
| JP | 2018177829 | * | 11/2018 |
| JP | 2019-026845 A | | 2/2019 |
| JP | 2019-059855 A | | 4/2019 |
| JP | 2019-111687 A | | 7/2019 |
| JP | 2020192711 | * | 12/2020 |
| WO | 2010/123064 A1 | | 10/2010 |
| WO | 2016/052119 A1 | | 4/2016 |
| WO | 2017/013984 A1 | | 1/2017 |
| WO | 2017/163738 A1 | | 9/2017 |
| WO | 2019/181840 A1 | | 9/2019 |
| WO | 2019/187665 A1 | | 10/2019 |

OTHER PUBLICATIONS

English translation of Written Opinion dated Sep. 1, 2020, issued by the International Searching Authority in Application No. PCT/JP2020/021915; 10 pages.

* cited by examiner

INK FOR IMPERMEABLE BASE MATERIAL AND IMAGE RECORDING METHOD

CROSS-REFERENCE TO RELATED APPLICATIONS

This application is a continuation application of International Application No. PCT/JP2020/021915, filed Jun. 3, 2020, the disclosure of which is incorporated herein by reference in its entirety. Further, this application claims priority from Japanese Patent Application No. 2019-136999, filed Jul. 25, 2019, the disclosure of which is incorporated herein by reference in its entirety.

BACKGROUND OF THE INVENTION

1. Field of the Invention

The present disclosure relates to an ink for an impermeable base material, and an image recording method.

2. Description of the Related Art

In the related art, various examinations have been performed on inks used for image recording.

For example, JP2019-59855A discloses, as an aqueous ink composition for inkjet recording which exhibits excellent preservation stability and filterability, has excellent jettability and drying properties in a case of being applied to an inkjet recording method, and is capable of forming a high-quality image with excellent rub resistance, an aqueous ink composition for inkjet recording, containing water, an organic solvent, and resin fine particles, in which the organic solvent contains a hydrophobic organic solvent having a C log P value of 0 to 3.5, the content of the hydrophobic organic solvent in the aqueous ink composition for inkjet recording is in a range of 0.5% to 10% by mass, and the resin fine particles have a structural unit (I) and a structural unit (II) respectively represented by specific formulae.

JP2016-69583A discloses, as an aqueous ink composition which is capable of forming an image excellent in rub resistance, scratch resistance, blocking resistance and also exhibits satisfactory jetting stability in a case of being used as an ink for inkjet recording, an aqueous ink composition containing at least an aqueous medium and resin fine particles, in which the resin of the resin fine particles has a structural unit (a), a structural unit (b), and a structural unit (c). Here, the structural unit (a) is a specific structural unit containing an amino group in a side chain, the structural unit (b) is a specific structural unit containing an acidic group, and the structural unit (c) is a specific structural unit containing an alkyl group having 12 to 22 carbon atoms, a specific structural unit having a fluoroethylene structure in a side chain, or a specific structural unit having a polysiloxane structure in a side chain.

WO2016/52119A discloses, as an aqueous ink composition which is capable of forming an image excellent in rub resistance, scratch resistance, and blocking resistance and also exhibits satisfactory jetting stability in a case of being used as an ink for inkjet recording, an aqueous ink composition containing at least an aqueous medium and resin fine particles formed of a resin, in which the resin has the following structural units (a), (b), and (c). Here, the structural unit (a) is a structural unit having an amine structure in a side chain, the structural unit (b) is a structural unit containing an acidic group, and the structural unit (c) is a structural unit containing a group selected from a monovalent group represented by -L-OH, a divalent group represented by —CONR$^C$—, or a divalent group represented by —SO$_2$NR$^C$—. L represents an alkylene group having 1 to 10 carbon atoms, and R$^C$ represents a hydrogen atom or an alkyl group.

JP2019-26845A discloses, as an aqueous ink for inkjet recording with excellent bleed resistance, an aqueous ink for inkjet recording, containing a pigment, a polymer, a water-soluble organic solvent, and water, in which the polymer is a random copolymer or a block copolymer having (a) structural unit derived from one or more monomers selected from acrylic acid and methacrylic acid and (b) structural unit derived from a hydrophobic vinyl monomer, which is a carboxy group-containing polymer having an acid value of 150 to 300 mgKOH/g, the water-soluble organic solvent contains one or more compounds selected from polyhydric alcohol and polyhydric alcohol alkyl ether, the total content of the polyhydric alcohol and the polyhydric alcohol alkyl ether in the ink is 18% by mass or greater, and the organic solvent contains a compound releasing formaldehyde.

JP2018-177828A discloses, as a resin dispersion for an aqueous inkjet ink which is capable of achieving both ink physical properties such as preservation stability and jettability and coating film properties such as gloss, abrasion resistance, water resistance, and solvent resistance, a resin dispersion for an aqueous inkjet ink, containing an aqueous medium and resin particles serving as an emulsion polymerization product of a monomer mixture that contains greater than 58.5% by mass and less than 96.7% by mass of a styrene monomer, greater than 3% by mass and less than 9.6% by mass of a (meth)acrylic acid alkyl ester monomer containing an alkyl group having 4 to 12 carbon atoms, 0.1% to 10% by mass of a carboxyl group-containing monomer, 0.1% to 10% by mass of an alkoxysilyl group-containing monomer, and 0.1% to 10% by mass of a surfactant monomer. JP2018-177828A also discloses an aqueous inkjet ink formed of the above-described resin dispersion for an aqueous inkjet ink.

SUMMARY OF THE INVENTION

Meanwhile, in image recording using ink, an image may be recorded not on a permeable base material such as paper but on an impermeable base material such as a resin base material.

In a case where an image is recorded on an impermeable base material, it is necessary to record an image having excellent adhesiveness to the impermeable base material (hereinafter, also simply referred to as "the adhesiveness") and suppressed streak unevenness in some cases.

An object of the present disclosure is to provide an ink for an impermeable base material and an image recording method that enable recording of an image having excellent adhesiveness to an impermeable base material and suppressed streak unevenness.

Specific means for achieving the above-described objects include the following aspects.

<1> An ink for an impermeable base material, comprising: an aqueous medium; and resin particles, in which a resin of the resin particles has a glass transition temperature of −40° C. or higher and 85° C. or lower, the resin has at least one selected from the group consisting of the following structural unit (1), the following structural unit (2), and the following structural unit (3) and at least one of an acid group or a salt of the acid group, an acid value of the resin, which is a total number of millimoles of the acid group and the salt of the acid group per 1 g of the resin, is 0.10 mmol/g or greater and 2.65 mmol/g or less, and a proportion of a water-soluble organic solvent having a boiling point of 250° C. or higher in the aqueous medium is 3% by mass or less.

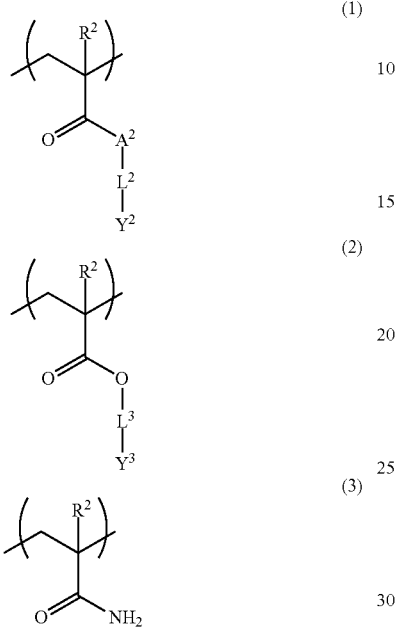

In the structural unit (1) to the structural unit (3), $R^2$ represents a hydrogen atom or an alkyl group having 1 to 4 carbon atoms.

In the structural unit (1), $A^2$ represents —NH— or —N($L^4$-$Y^4$)—, $L^2$ represents a divalent group which is one selected from the first group consisting of an alkylene group, an alkenylene group, an alkynylene group, an arylene group, —O—, —NH—, —N($L^4$-$Y^4$)—, and —C(=O)—, a divalent group which is obtained by combining two or more selected from the first group, or a single bond, $Y^2$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$, and two of $A^2$, $L^2$, and $Y^2$ may be linked to each other to form a ring.

In the structural unit (2), $L^3$ represents a divalent group which is one selected from the first group or a divalent group which is obtained by combining two or more selected from the first group, $Y^3$ represents a halogen atom, —OH, —$OR^3$, —$NH_2$, —$NR^3H$, —$NR^3R^4$, or —C(=O)$R^3$, and $L^3$ and $Y^3$ may be linked to each other to form a ring.

In the structural unit (1) and the structural unit (2), $L^4$ represents a divalent group which is one selected from the second group consisting of an alkylene group, an alkenylene group, an alkynylene group, an arylene group, —O—, —NH—, and —C(=O)—, a divalent group which is obtained by combining two or more selected from the second group, or a single bond, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$, and $R^3$ and $R^4$ each independently represent an alkyl group, an alkenyl group, an alkynyl group, or an aryl group.

In the structural unit (1) and the structural unit (2), $L^4$ and $Y^4$ in —N($L^4$-$Y^4$)— may be linked to each other to form a ring, and $R^3$ and $R^4$ in —$NR^3R^4$ may be linked to each other to form a ring.

<2> The ink for an impermeable base material according to <1>, in which the resin has a structural unit containing at least one of the acid group or the salt of the acid group, and the structural unit containing at least one of the acid group or the salt of the acid group is at least one selected from the group consisting of the following structural unit (4), the following structural unit (5), and the following structural unit (6).

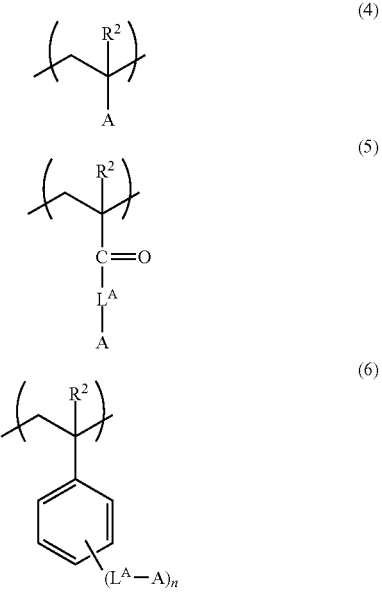

In the structural unit (4) to the structural unit (6), $R^2$ represents a hydrogen atom or an alkyl group having 1 to 4 carbon atoms, $L^A$ represents a divalent group which is one selected from the third group consisting of an alkylene group having 1 to 30 carbon atoms, an arylene group having 6 to 10 carbon atoms, —O—, —NH—, —S—, —C(=O)—, and —CH(—OH)—, a divalent group which is obtained by combining two or more selected from the third group, or a single bond, A represents an acid group or a salt of the acid group, and n represents an integer of 1 to 5.

<3> The ink for an impermeable base material according to <1> or <2>, in which the resin further has at least one selected from the group consisting of the following structural unit (A), the following structural unit (B), the following structural unit (C), the following structural unit (D), the following structural unit (E), and the following structural unit (F).

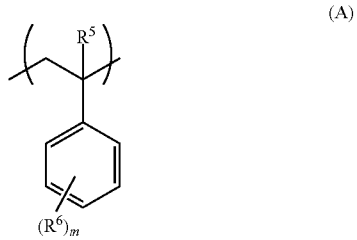

-continued

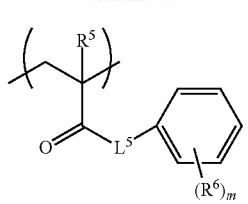   (B)

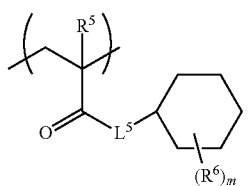   (C)

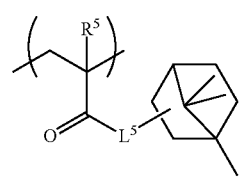   (D)

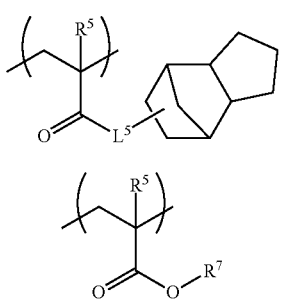   (E)

(F)

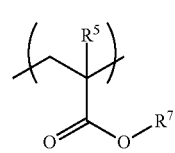

In the structural unit (A) to the structural unit (F), $R^5$ represents a hydrogen atom or a methyl group, $R^6$ represents an alkyl group, an alkenyl group, or an alkynyl group, $R^7$ represents an alkyl group having 2 to 22 carbon atoms, an alkenyl group having 2 to 22 carbon atoms, or an alkynyl group having 2 to 22 carbon atoms, m represents an integer of 0 to 5, n represents an integer of 0 to 11, $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond.

<4> The ink for an impermeable base material according to <3>, in which a total content of the structural unit (1), the structural unit (2), the structural unit (3), the structural unit (A), the structural unit (B), the structural unit (C), the structural unit (D), the structural unit (E), and the structural unit (F) is 70% by mass or greater with respect to an entirety of the resin.

<5> The ink for an impermeable base material according to <3> or <4>, in which the resin has at least one selected from the group consisting of the structural unit (C), the structural unit (D), the structural unit (E), and the structural unit (F).

<6> The ink for an impermeable base material according to any one of <1> to <5>, in which the resin has a glass transition temperature of −20° C. or higher and 55° C. or lower.

<7> The ink for an impermeable base material according to any one of <1> to <6>, in which a content of a structural unit derived from an alkyl (meth)acrylate containing a chain alkyl group having 2 or more carbon atoms in the resin is 5% by mass or less with respect to an entirety of the resin.

<8> The ink for an impermeable base material according to any one of <1> to <7>, in which a total content of the structural unit (1), the structural unit (2), and the structural unit (3) is 5% by mass or greater with respect to an entirety of the resin.

<9> The ink for an impermeable base material according to any one of <1> to <8>, in which the resin has at least one selected from the group consisting of the structural unit (1) and the structural unit (2).

<10> The ink for an impermeable base material according to any one of <1> to <9>, in which the resin has the structural unit (2), and $Y^3$ in the structural unit (2) represents —OH, —NH$_2$, —NR$^3$H, or —NR$^3$R$^4$.

<11> The ink for an impermeable base material according to any one of <1> to <10>, in which the ink is an inkjet ink.

<12> The ink for an impermeable base material according to any one of <1> to <11>, further comprising: a colorant.

<13> An image recording method comprising: a step of applying the ink for an impermeable base material according to any one of <1> to <12> onto an impermeable base material.

According to the present disclosure, it is possible to provide an ink for an impermeable base material and an image recording method that enable recording of an image having excellent adhesiveness to an impermeable base material and suppressed streak unevenness.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, the concept of "(meth)acryl" includes both acryl and methacryl, the concept of "(meth)acrylate" includes both acrylate and methacrylate, and the concept "(meth)acryloyl" includes both acryloyl and methacryloyl.

In the present disclosure, "*" in a chemical formula represents a bonding position.

In the present disclosure, the "ink for an impermeable base material" indicates an ink used for recording an image on an impermeable base material.

In the present disclosure, the "image" indicates a whole film to be formed using an ink, and the "recording of an image" and the "image recording" respectively indicate formation of a film and film formation. Further, the concept of "image" in the present disclosure also includes a solid image.

[Ink for Impermeable Base Material]

An ink for an impermeable base material of the present disclosure (hereinafter, also simply referred to as an "ink") is an ink containing an aqueous medium and resin particles, in which a resin of the resin particles has a glass transition temperature of −40° C. or higher and 85° C. or lower, the resin has at least one selected from the group consisting of the following structural unit (1), the following structural unit (2), and the following structural unit (3) and at least one of an acid group or a salt of the acid group, the acid value of the resin, which is the total number of millimoles of the acid group and the salt of the acid group per 1 g of the resin, is 0.10 mmol/g or greater and 2.65 mmol/g or less, and the proportion of a water-soluble organic solvent having a boiling point of 250° C. or higher in the aqueous medium is 3% by mass or less.

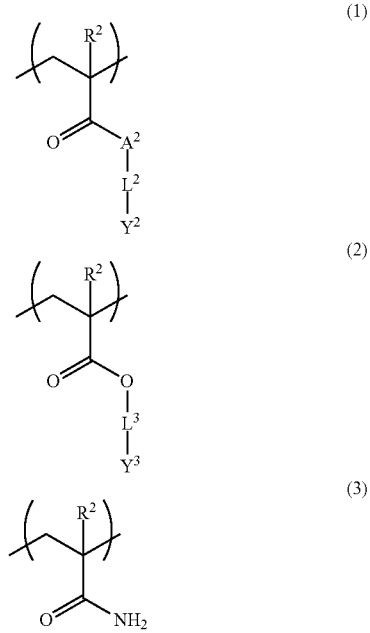

In the structural unit (1) to the structural unit (3), $R^2$ represents a hydrogen atom or an alkyl group having 1 to 4 carbon atoms.

In the structural unit (1), $A^2$ represents —NH— or —N($L^4$-$Y^4$)—, $L^2$ represents a divalent group which is one selected from the first group consisting of an alkylene group, an alkenylene group, an alkynylene group, an arylene group, —O—, —NH—, —N($L^4$-$Y^4$)—, and —C(=O)—, a divalent group which is obtained by combining two or more selected from the first group, or a single bond, $Y^2$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$, and two of $A^2$, $L^2$, and $Y^2$ may be linked to each other to form a ring.

In the structural unit (2), $L^3$ represents a divalent group which is one selected from the first group or a divalent group which is obtained by combining two or more selected from the first group, $Y^3$ represents a halogen atom, —OH, —$OR^3$, —$NH_2$, —$NR^3H$, —$NR^3R^4$, or —C(=O)$R^3$, and $L^3$ and $Y^3$ may be linked to each other to form a ring.

In the structural unit (1) and the structural unit (2), $L^4$ represents a divalent group which is one selected from the second group consisting of an alkylene group, an alkenylene group, an alkynylene group, an arylene group, —O—, —NH—, and —C(=O)—, a divalent group which is obtained by combining two or more selected from the second group, or a single bond, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$, and $R^3$ and $R^4$ each independently represent an alkyl group, an alkenyl group, an alkynyl group, or an aryl group.

In the structural unit (1) and the structural unit (2), $L^4$ and $Y^4$ in —N($L^4$-$Y^4$)— may be linked to each other to form a ring, and $R^3$ and $R^4$ in —$NR^3R^4$ may be linked to each other to form a ring.

According to the ink of the present disclosure, an image having excellent adhesiveness to an impermeable base material (that is, the adhesiveness to an impermeable base material) and suppressed streak unevenness can be recorded.

The reason why such an effect is exhibited is assumed as follows.

In a case where an image is recorded on an impermeable base material, the drying properties of the image are insufficient because the aqueous medium in the ink is unlikely to permeate into the base material as compared with a case where an image is recorded on a permeable base material such as a paper base material, and as a result, the adhesiveness between the image and the base material tends to be insufficient.

However, according to the ink of the present disclosure, it is considered that an image having excellent adhesiveness to an impermeable base material can be recorded due to the reasons described below.

It is considered that since the resin of the resin particles contained in the ink has a glass transition temperature of −40° C. or higher, the intensity of the image to be recorded using the ink is improved, and thus the adhesiveness of the image to the impermeable base material can be improved.

It is considered that since the resin of the resin particles contained in the ink has a glass transition temperature of 85° C. or lower, the image is likely to follow the surface of the impermeable base material (particularly even in a case where the surface of the impermeable base material has fine unevenness, the image is likely to follow the surface having fine unevenness), and thus the adhesiveness of the image to the impermeable base material can be improved.

The resin has at least one selected from the group consisting of a structural unit (1), a structural unit (2), and a structural unit (3).

All the structural unit (1) to the structural unit (3) have a hydrogen-bonding group in a side chain moiety.

Here, the hydrogen-bonding group is a group capable of forming a hydrogen bond (for example, a —C(=O)— group, a —O— group, a —NH— group, a —N($L^4$-$Y^4$)— group, a —$NH_2$ group, or a —OH group).

It is considered that since the resin has at least one selected from the group consisting of the structural unit (1), the structural unit (2), and the structural unit (3), the adhesiveness of the image to the impermeable base material can be improved due to the action of the hydrogen bonding group (for example, a —NH— group, a —N($L^4$-$Y^4$)— group, a —$NH_2$ group, or a —OH group) present in a side chain of each of the structural units.

Since the acid value of the resin is 2.65 mmol/g or less, the drying properties of the image are improved (that is, remaining of the aqueous medium in the image is suppressed), and thus the adhesiveness of the image to the impermeable base material can be improved.

Here, the acid value of the resin indicates the total number of millimoles of the acid group and the salt of the acid group per 1 g of the resin.

In the ink of the present disclosure, the proportion of the water-soluble organic solvent having a boiling point of 250° C. or higher in the aqueous medium is 3% by mass or less. In this manner, the drying properties of the image are improved, and thus the adhesiveness of the image to the impermeable base material can be improved.

According to the ink of the present disclosure, it is considered that an image having excellent adhesiveness to an impermeable base material can be recorded due to the above-described reasons.

Further, typically in a case where an image is recorded on an impermeable base material, since the aqueous medium in the ink is unlikely to permeate into the base material as compared with a case where an image is recorded on a permeable base material such as a paper base material, streak unevenness of the image tends to occur.

Here, the streak unevenness of the image indicates streak-like unevenness that is present in a solid image. The streak unevenness of an image is likely to occur in a case where an image is recorded on an impermeable base material and in a case where the wettability of the ink with respect to the impermeable base material is insufficient.

According to the ink of the present disclosure, an image having suppressed streak unevenness can be recorded on an impermeable base material. The reason for this is considered to be that since the resin contains at least one of an acid group or a salt of the acid group, and the acid value of the resin is 0.10 mmol/g or greater, the wettability of the ink with respect to the impermeable base material is improved.

<Impermeable Base Material>

The ink of the present disclosure (that is, the ink for an impermeable base material of the present disclosure) is used for image recording on an impermeable base material.

In the present disclosure, the impermeability in the impermeable base material indicates a property that the water absorption rate in 24 hours which is measured in conformity with ASTM D570 is 2.5% or less.

Here, the unit "%" of the water absorption rate is on a mass basis.

The water absorption rate is preferably 1.0% or less and more preferably 0.5% or less.

Examples of the material of the impermeable base material include glass, a metal (such as aluminum, zinc, or copper), and a resin (such as a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is suitable that the shape of the impermeable base material is a sheet (film) shape or a plate shape.

Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Further, the thickness of the impermeable base material is preferably in a range of 0.1 μm to 1000 μm, more preferably in a range of 0.1 μm to 800 μm, and still more preferably in a range of 1 μm to 500 μm.

A resin base material is preferable as the impermeable base material.

Examples of the resin of the resin base material are as described above, but polypropylene, polyethylene, polyethylene terephthalate, nylon, an acrylic resin, or a polyvinyl chloride resin is preferable from the viewpoint of versatility.

Examples of the resin base material include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

The impermeable base material may be subjected to a hydrophilization treatment.

Examples of the hydrophilization treatment include a corona treatment, a plasma treatment, a flame treatment, a heat treatment, an abrasion treatment, and a light irradiation treatment (such as a UV treatment), but the hydrophilization treatment is not limited thereto.

The corona treatment can be performed using Corona Master (PS-10S, manufactured by Shinko Electric & Instrumentation Co., Ltd.) or the like. The conditions for the corona treatment may be appropriately selected according to the kind of the impermeable base material and the like.

As described above, the ink of the present disclosure is used for an impermeable base material.

However, the ink of the present disclosure may be used for both an impermeable base material and a permeable base material (for example, permeable paper, a permeable textile, or permeable non-woven fabric).

Here, the permeability of the permeable base material indicates the above-described property that the water absorption rate is greater than 2.5%.

Hereinafter, each component that can be contained in the ink of the present disclosure will be described.

<Aqueous Medium>

The inks of the present disclosure contain an aqueous medium.

The aqueous medium contained in the ink of the present disclosure may be used alone or in combination of two or more kinds thereof.

Examples of the aqueous medium include water and a water-soluble organic solvent.

It is more preferable that the aqueous medium is water or a water-soluble organic solvent.

Examples of water include ion exchange water and distilled water.

In the present disclosure, the term "water-soluble" indicates a property that 1 g or greater (preferably 3 g or greater or more preferably 5 g or greater) of a substance is dissolved in 100 g of water at 25° C.

The content of the aqueous medium is preferably 30% by mass or greater, more preferably 50% by mass or greater, and still more preferably 70% by mass or greater with respect to the total amount of the ink.

The upper limit of the content of the aqueous medium depends on the amount of other components and is, for example, 98% by mass, preferably 95% by mass, and more preferably 90% by mass with respect to the total amount of the ink.

In a case where the aqueous medium contains water, the content of water is preferably 30% by mass or greater, more preferably 40% by mass or greater, still more preferably 50% by mass or greater, and even still more preferably 60% by mass or greater with respect to the total amount of the ink.

The upper limit of the content of water depends on the amount of other components and is, for example, 99% by mass, preferably 95% by mass, and more preferably 90% by mass with respect to the total amount of the ink.

In the ink of the present disclosure, the proportion of the water-soluble organic solvent having a boiling point of 250° C. or higher in the aqueous medium is 3% by mass or less.

In this manner, the adhesiveness of the image is improved.

In the present disclosure, the "boiling point" is a boiling point at 1 atmosphere pressure (1 atm).

The proportion of the water-soluble organic solvent having a boiling point of 250° C. or higher in the aqueous medium is preferably 2% by mass or less and more preferably 1% by mass or less.

The proportion of the water-soluble organic solvent having a boiling point of 250° C. or higher in the aqueous medium may be 0% by mass. That is, the aqueous medium may not contain a water-soluble organic solvent having a boiling point of 250° C. or higher.

Examples of the water-soluble organic solvent having a boiling point of 250° C. or higher include glycerin, diethylene glycol dibutyl ether, triethylene glycol, triethylene glycol butyl methyl ether, tripropylene glycol, tetraethylene glycol dimethyl ether, 1,2,6-hexanetriol, trimethylolpropane, and a compound represented by Structural Formula (S).

Structural Formula (S)

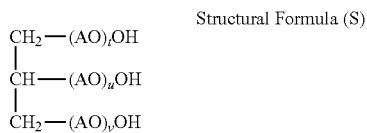

In Structural Formula (S), t, u, and v each independently represent an integer of 1 or greater and satisfy a relationship of "t+u+v=3 to 15", and AO represents ethyleneoxy (EO) or propyleneoxy (PO).

AO's in $(AO)_t$, $(AO)_u$, and $(AO)_v$ may be the same as or different from each other.

t+u+v is preferably in a range of 3 to 12 and more preferably in a range of 3 to 10.

It is preferable that AO represents propyleneoxy.

Hereinafter, examples of the compound represented by Structural Formula (S) will be described, but the compound represented by Structural Formula (S) is not limited to the following examples.

In the following examples, the "POP (3) glyceryl ether" described below is glyceryl ether in which a total of three propyleneoxys are bonded to glycerin, and the same applies to other descriptions.

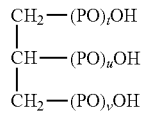

-continued t + u + v = 3  POP (3) Glyceryl ether
t + u + v = 4  POP (4) Glyceryl ether
t + u + v = 5  POP (5) Glyceryl ether
t + u + v = 6  POP (6) Glyceryl ether
t + u + v = 7  POP (7) Glyceryl ether Examples of commercially available products of the compound represented by Structural Formula (S) include SANNIX (registered trademark) GP250 (manufactured by Sanyo Chemical, Ltd.).

It is preferable that the aqueous medium contains at least one water-soluble organic solvent having a boiling point of lower than 250° C.

In a case where the aqueous medium contains a water-soluble organic solvent having a boiling point of lower than 250° C., the jettability of the ink from an inkjet head (hereinafter, also simply referred to as "the jettability") in a case where the ink of the present disclosure is an inkjet ink is improved, and the drying properties of the ink are further improved.

Examples of the water-soluble organic solvent having a boiling point of lower than 250° C. include alkanediols (polyhydric alcohols) such as ethylene glycol and propylene glycol, sugar alcohols, alkyl alcohols having 1 to 4 carbon atoms such as ethanol, methanol, butanol, propanol, and isopropanol, and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether.

These water-soluble organic solvents having a boiling point of lower than 250° C. can be used alone or in combination of two or more kinds thereof.

From the viewpoint of further improving the adhesiveness of the image, the boiling point of the water-soluble organic solvent having a boiling point of lower than 250° C. is preferably lower than 240° C., more preferably lower than 230° C., still more preferably lower than 220° C., and even still more preferably lower than 210° C.

The lower limit of the boiling point of the water-soluble organic solvent having a boiling point of lower than 250° C. may be, for example, 100° C., 120° C., 140° C., or 160° C.

The proportion of the water-soluble organic solvent having a boiling point of lower than 250° C. in the aqueous medium is preferably 1% by mass or greater, more preferably 5% by mass or greater, and still more preferably 10% by mass or greater.

The upper limit of the proportion of the water-soluble organic solvent having a boiling point of lower than 250° C. in the aqueous medium may be, for example, 70% by mass, 60% by mass, 50% by mass, or 40% by mass.

<Resin Particles>

The ink of the present disclosure contains resin particles (hereinafter, also referred to as "specific resin particles").

The specific resin particles are particles formed of a resin (hereinafter, also referred to as a "specific resin").

The specific resin particles contained in the ink of the present disclosure may be used alone or in combination of two or more kinds thereof.

(Glass Transition Temperature)

The glass transition temperature of the specific resin is −40° C. or higher and 85° C. or lower.

In this manner, the adhesiveness of the image is improved.

From the viewpoint of further improving the adhesiveness of the image, the glass transition temperature of the specific resin is preferably −30° C. or higher, more preferably −20° C. or higher, and still more preferably 0° C. or higher.

From the viewpoint of further improving the adhesiveness of the image, the glass transition temperature of the specific resin is preferably 65° C. or lower, more preferably 55° C. or lower, and still more preferably 40° C. or lower.

As a preferred example of the range, the glass transition temperature of the specific resin is −20° C. or higher and 55° C. or lower.

In the present disclosure, the glass transition temperature (hereinafter, also referred to as "Tg") of the specific resin indicates the extrapolated glass transition initiation temperature (hereinafter, also referred to as "Tig") which is measured in conformity with the method described in JIS K 7121: 1987 or JIS K 6240: 2011 using differential scanning calorimetry (DSC).

The method of measuring the Tg (that is, Tig) in the present disclosure will be described in more detail.

First, the specific resin is maintained at a temperature lower than the expected Tg of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The temperature of the intersection of a straight line obtained by extending the base line on a low temperature side in the DTA curve or the DSC curve onto a high temperature side and a tangent drawn at a point where the gradient of a curve from a step-like change portion of the glass transition is maximized is defined as Tg (that is, Tig).

In a case where the ink contains two or more kinds of specific resin particles, the glass transition temperatures of individual specific resins of individual specific resin particles contained in the ink are weighted and averaged based on the mass fractions of individual specific resins, and the obtained weighted average value is defined as the glass transition temperature (Tg) of the specific resin of the specific resin particles contained in the ink.

Hereinafter, each structural unit in the specific resin will be described.

In a case where a plurality of groups represented by the same symbol (for example, $R^2$) are present in the specific resin, the plurality of groups (for example, $R^2$) may be the same as or different from each other.

(Structural Unit (1) to Structural Unit (3))

The specific resin has at least one selected from the group consisting of the following structural unit (1), the following structural unit (2), and the following structural unit (3) (in the present disclosure, also referred to as "the structural unit (1) to the structural unit (3)", "the structural units (1) to (3)", or "the units (1) to (3)").

In this manner, the adhesiveness between the image and the impermeable base material is improved due to the action of the hydrogen-bonding group in the structural unit.

Structural unit (1)

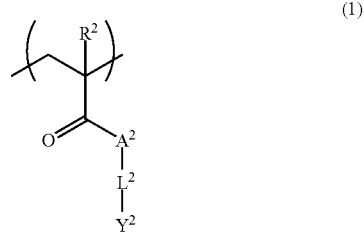

In the structural unit (1), $R^2$ represents a hydrogen atom or an alkyl group having 1 to 4 carbon atoms.

In the structural unit (1), it is preferable that $R^2$ represents a hydrogen atom or a methyl group.

In the structural unit (1), $A^2$ represents —NH— or —N($L^4$-$Y^4$)—.

—N($L^4$-$Y^4$)— will be described below.

In the structural unit (1), $L^2$ represents a divalent group which is one selected from the first group (that is, the first group consisting of an alkylene group, an alkenylene group, an alkynylene group, an arylene group, —O—, —NH—, —N($L^4$-$Y^4$)—, and —C(=O)—), a divalent group which is obtained by combining two or more selected from the first group, or a single bond.

—N($L^4$-$Y^4$)— will be described below.

Each of the alkyl group, the alkenyl group, the alkynyl group, the alkylene group, the alkenylene group, and the alkynylene group as $L^2$ in the structural unit (1) may be linear or may have a branched structure.

Each of the alkylene group, the alkenylene group, and the alkynylene group as $L^2$ in the structural unit (1) may have a substituent. As the substituent in this case, the same group as that represented by $Y^3$ in the structural unit (2) described below (that is, at least one selected from the group consisting of a halogen atom, —OH, —$OR^3$, —$NH_2$, —$NR^3H$, —$NR^3R^4$, and —C(=O)$R^3$, and $R^3$ and $R^4$ each independently represent an alkyl group, an alkenyl group, an alkynyl group, or an aryl group) is preferable.

The arylene group as $L^2$ in the structural unit (1) may have a substituent. As the substituent in this case, the same group as that represented by $Y^2$ described below (that is, at least one selected from the group consisting of an alkyl group, an alkenyl group, an alkynyl group, an aryl group, a halogen atom, —OH, —$OR^3$, —$NH_2$, —$NR^3H$, —$NR^3R^4$, and —C(=O)$R^3$, and $R^3$ and $R^4$ each independently represent an alkyl group, an alkenyl group, an alkynyl group, or an aryl group) is preferable.

The number of carbon atoms in each of the alkylene group, the alkenylene group, and the alkynylene group as $L^2$ in the structural unit (1) is preferably in a range of 1 to 6, more preferably in a range of 1 to 4, and still more preferably 1 or 2.

As the arylene group as $L^2$ in the structural unit (1), a phenylene group or a naphthylene group is preferable, and a phenylene group is more preferable.

As the "divalent group which is obtained by combining two or more selected from the first group" represented by $L^2$, a divalent group formed by combining at least one of an alkylene group, an alkenylene group, an alkynylene group, or an arylene group and at least one of —O—, —NH—, —N($L^4$-$Y^4$)—, or —C(=O)— is preferable, and the following group (AO2) is particularly preferable.

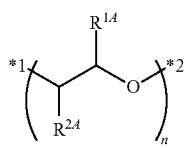

(AO2)

In the group (AO2), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to $A^2$, and *2 represents a bonding position with respect to $Y^2$.

It is preferable that in a case where one of $R^{1A}$ and $R^{2A}$ represents a methyl group, the other represents a hydrogen atom.

$L^2$ in the structural unit (1) represents preferably a single bond, an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or a group (AO2) and more preferably a single bond or an alkylene group having 1 to 6 carbon atoms (more preferably 1 to 4 carbon atoms and still more preferably 1 or 2 carbon atoms).

In the structural unit (1), $Y^2$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$.

$R^3$ and $R^4$ each independently represent an alkyl group, an alkenyl group, an alkynyl group, or an aryl group.

As the halogen atom as $Y^2$ in the structural unit (1), a fluorine atom, a chlorine atom, a bromine atom, or an iodine atom is preferable, a fluorine atom, a chlorine atom, or a bromine atom is more preferable, and a fluorine atom or a chlorine atom is still more preferable.

Each of the alkyl group, the alkenyl group, and the alkynyl group as $Y^2$ in the structural unit (1) may be linear or may have a branched structure.

The number of carbon atoms in each of the alkyl group, the alkenyl group, and the alkynyl group as $Y^2$ in the structural unit (1) is preferably in a range of 1 to 6, more preferably in a range of 1 to 4, and still more preferably 1 or 2.

As the aryl group represented by $Y^2$ in the structural unit (1), a phenyl group or a naphthyl group is preferable, and a phenyl group is more preferable.

The aryl group as $Y^2$ in the structural unit (1) may have a substituent. As the substituent in this case, the same group as that represented by $Y^2$ (that is, at least one selected from the group consisting of an alkyl group, an alkenyl group, an alkynyl group, an aryl group, a halogen atom, —OH, —$OR^3$, —$NH_2$, —$NR^3H$, —$NR^3R^4$, and —C(=O)$R^3$, and $R^3$ and $R^4$ each independently represent an alkyl group, an alkenyl group, an alkynyl group, or an aryl group) is preferable.

It is preferable that $Y^2$ in the structural unit (1) represents an alkyl group having 1 to 6 carbon atoms (more preferably 1 to 4 carbon atoms and still more preferably 1 or 2 carbon atoms), —OH, —$OR^3$, —$NH_2$, —$NR^3H$, —$NR^3R^4$, or —C(=O)$R^3$.

It is preferable that $R^3$ and $R^4$ each independently represent an alkyl group having 1 to 6 carbon atoms (more preferably 1 to 4 carbon atoms and still more preferably 1 or 2 carbon atoms).

In the structural unit (1), two of $A^2$, $L^2$, and $Y^2$ may be linked to each other to form a ring.

Next, —N($L^4$-$Y^4$)— in $A^2$ and $L^2$ will be described.

In —N($L^4$-$Y^4$)—, $L^4$ represents a divalent group which is one selected from the second group (that is, the second group consisting of an alkylene group, an alkenylene group, an alkynylene group, an arylene group, —O—, —NH—, and —C(=O)—), a divalent group which is obtained by combining two or more selected from the second group, or a single bond.

The second group is the same as the first group except that —N($L^4$-$Y^4$)— is not included.

In —N($L^4$-$Y^4$)—, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$.

In $Y^4$, $R^3$ and $R^4$ each independently represent an alkyl group, an alkenyl group, an alkynyl group, or an aryl group.

$R^3$ and $R^4$ in —$NR^3R^4$ may be linked to each other to form a ring.

$L^4$ and $Y^4$ in —N($L^4$-$Y^4$)— may be linked to each other to form a ring.

The preferred embodiment of $L^4$ in —N($L^4$-$Y^4$)— is the same as the preferred embodiment of $L^2$.

$L^4$ in —N($L^4$-$Y^4$)— represents preferably a single bond, an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or the following group (AO4) and more preferably a single bond or an alkylene group having 1 to 6 carbon atoms (more preferably 1 to 4 carbon atoms and still more preferably 1 or 2 carbon atoms).

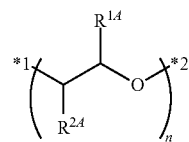

(AO4)

In the group (AO4), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to N (a nitrogen atom), and *2 represents a bonding position with respect to $Y^4$.

It is preferable that in a case where one of $R^{1A}$ and $R^{2A}$ represents a methyl group, the other represents a hydrogen atom.

It is still more preferable that $L^4$ in —N($L^4$-$Y^4$)— represents a single bond or an alkylene group having 1 to 6 carbon atoms (more preferably 1 to 4 carbon atoms and still more preferably 1 or 2 carbon atoms).

The preferred embodiment of $Y^4$ in —N($L^4$-$Y^4$)— is the same as the preferred embodiment of $Y^2$.

The number of carbon atoms of the entire structural unit (1) is preferably 30 or less, more preferably 20 or less, still more preferably 12 or less, and even still more preferably 8 or less.

Further, the number of carbon atoms of the entire structural unit (1) is 3 or greater and preferably 4 or greater.

Further, in the structural unit (1), it is also preferable that "-$A^2$-$L^2$-$Y^2$" represents any one of the group (1A) to the group (1H) shown below. In the group (1A) to the group (1H), * represents a bonding position.

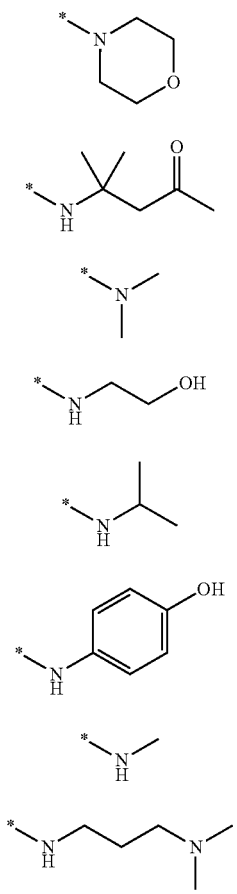

It is preferable that the structural unit (1) is a structural unit derived from a (meth)acrylamide compound or a structural unit derived from (meth)acryloyl morpholine.

The preferred number of carbon atoms in each of the (meth)acrylamide compound and the (meth)acryloyl morpholine is the same as the preferred number of carbon atoms in the entire structural unit (1).

In the present disclosure, the structural unit derived from the (meth)acrylamide compound is a structural unit formed of the (meth)acrylamide compound as a raw material.

The same applies to structural units derived from other compounds.

Hereinafter, specific examples of the structural unit (1) will be shown, but the structural unit (1) is not limited to the following specific examples.

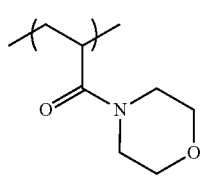

ACMO

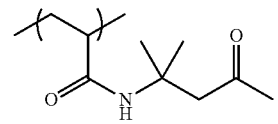

DAAM

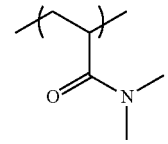

DMAAm

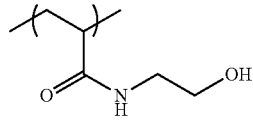

HEAAm

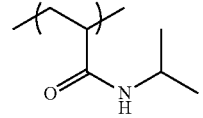

NIPAM

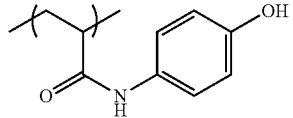

(1-1)

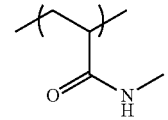

(1-2)

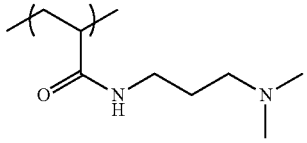

(1-3)

Structural unit (2)

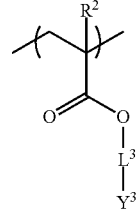

(2)

In the structural unit (2), $R^2$ represents a hydrogen atom or an alkyl group having 1 to 4 carbon atoms.

$R^2$ in the structural unit (2) has the same definition as that for $R^2$ in the structural unit (1), and the preferred embodiments thereof are also the same as described above.

In the structural unit (2), $L^3$ represents a divalent group which is one selected from the first group (that is, the first group consisting of an alkylene group, an alkenylene group, an alkynylene group, an arylene group, —O—, —NH—, —N($L^4$-$Y^4$)—, and —C(=O)—) or a divalent group which is obtained by combining two or more selected from the first group.

$L^3$ in the structural unit (2) is different from $L^2$ in the structural unit (1) in terms that $L^3$ does not represent a single bond.

Each of the alkyl group, the alkenyl group, the alkynyl group, the alkylene group, the alkenylene group, and the alkynylene group as $L^3$ in the structural unit (2) may be linear or may have a branched structure.

Each of the alkylene group, the alkenylene group, and the alkynylene group as $L^3$ in the structural unit (2) may have a substituent. As the substituent in this case, the same group as that represented by $Y^3$ described below (that is, at least one selected from the group consisting of a halogen atom, —OH, —$OR^3$, —$NH_2$, —$NR^3H$, —$NR^3R^4$, and —C(=O)$R^3$, and $R^3$ and $R^4$ each independently represent an alkyl group, an alkenyl group, an alkynyl group, or an aryl group) is preferable.

The arylene group as $L^3$ in the structural unit (2) may have a substituent. As the substituent in this case, the same group as that represented by $Y^2$ in the structural unit (1) described above (that is, at least one selected from the group consisting of an alkyl group, an alkenyl group, an alkynyl group, an aryl group, a halogen atom, —OH, —$OR^3$, —$NH_2$, —$NR^3H$, —$NR^3R^4$, and —C(=O)$R^3$, and $R^3$ and $R^4$ each independently represent an alkyl group, an alkenyl group, an alkynyl group, or an aryl group) is preferable.

The number of carbon atoms in each of the alkylene group, the alkenylene group, and the alkynylene group as $L^3$ in the structural unit (2) is preferably in a range of 1 to 6, more preferably in a range of 1 to 4, and still more preferably 1 or 2.

As the arylene group as $L^3$ in the structural unit (2), a phenylene group or a naphthylene group is preferable, and a phenylene group is more preferable.

As the "divalent group which is obtained by combining two or more selected from the first group" represented by $L^3$, a divalent group formed by combining at least one of an alkylene group, an alkenylene group, an alkynylene group, or an arylene group and at least one of —O—, —NH—, —N($L^4$-$Y^4$)—, or —C(=O)— is preferable, and the following group (AO3) is particularly preferable.

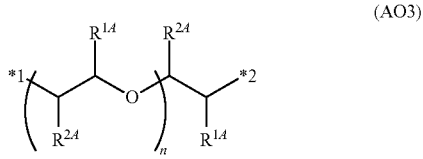

(AO3)

In the group (AO3), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to 0 (an oxygen atom), and *2 represents a bonding position with respect to $Y^3$.

It is preferable that in a case where one of $R^{1A}$ and $R^{2A}$ represents a methyl group, the other represents a hydrogen atom.

It is preferable that $L^3$ in the structural unit (2) represents an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or a group (AO3).

In the structural unit (2), $Y^3$ represents a halogen atom, —OH, —$OR^3$, —$NH_2$, —$NR^3H$, —$NR^3R^4$, or —C(=O)$R^3$.

$R^3$ and $R^4$ each independently represent an alkyl group, an alkenyl group, an alkynyl group, or an aryl group.

$Y^3$ in the structural unit (2) is different from $Y^2$ in the structural unit (1) in terms that $Y^3$ does not represent any of an alkyl group, an alkenyl group, an alkynyl group, or an aryl group.

$Y^3$ in the structural unit (2) has the same definition as that for $Y^2$ in the structural unit (1) except for the above-described point, and the preferred embodiments thereof are also the same as described above.

It is still more preferable that $Y^3$ in the structural unit (2) represents —OH, —$NH_2$, —$NR^3H$, —$NR^3R^4$.

—N($L^4$-$Y^4$)— in the structural unit (2) has the same definition as that for —N($L^4$-$Y^4$)— in the structural unit (1), and the preferred embodiments thereof are also the same as described above.

$R^3$ and $R^4$ in the structural unit (2) each have the same definition as that for $R^3$ and $R^4$ in the structural unit (1), and the preferred embodiments thereof are also the same as described above.

$L^3$ and $Y^3$ in the structural unit (2) may be linked to each other to form a ring.

From the viewpoint of further enhancing the hydrophilicity of the entire structural unit (2), the number of carbon atoms of the entire structural unit (2) is preferably 30 or less, more preferably 20 or less, still more preferably 12 or less, and even still more preferably 10 or less.

The number of carbon atoms of the entire structural unit (2) is 3 or greater and preferably 4 or greater.

Further, in the structural unit (2), it is also preferable that "-$L^3$-$Y^3$" represents any one of the group (2A) to the group (2S) shown below. In the group (2A) to the group (2S), * represents a bonding position.

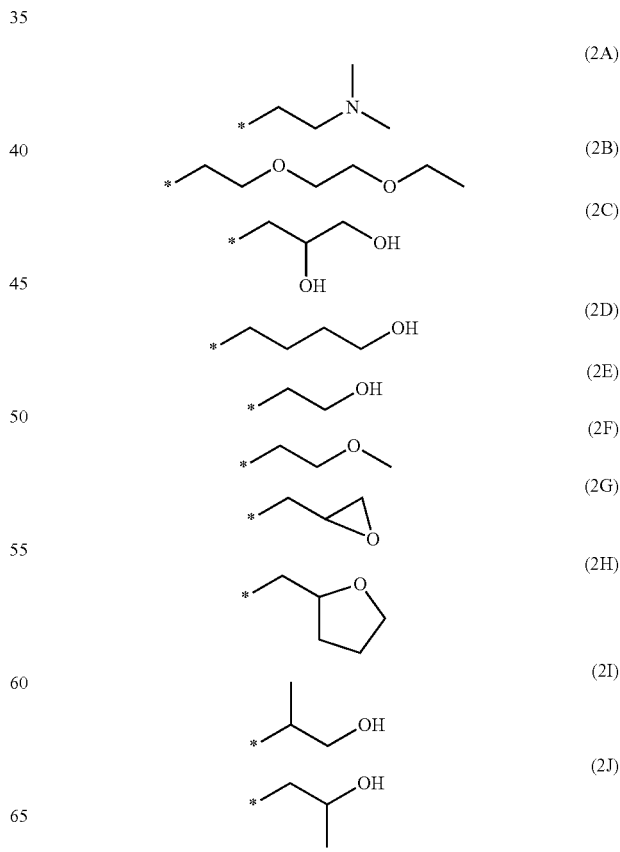

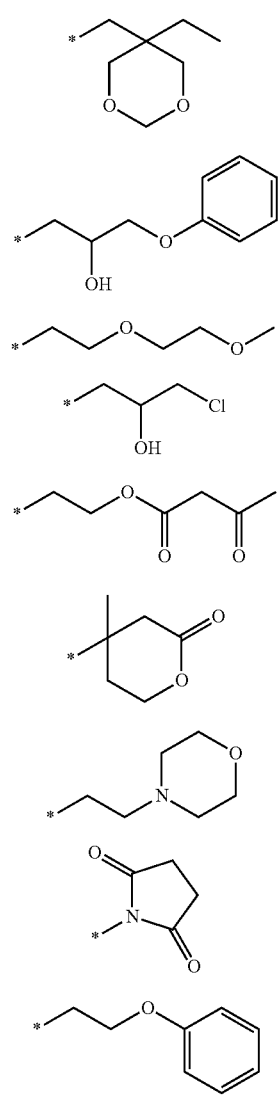

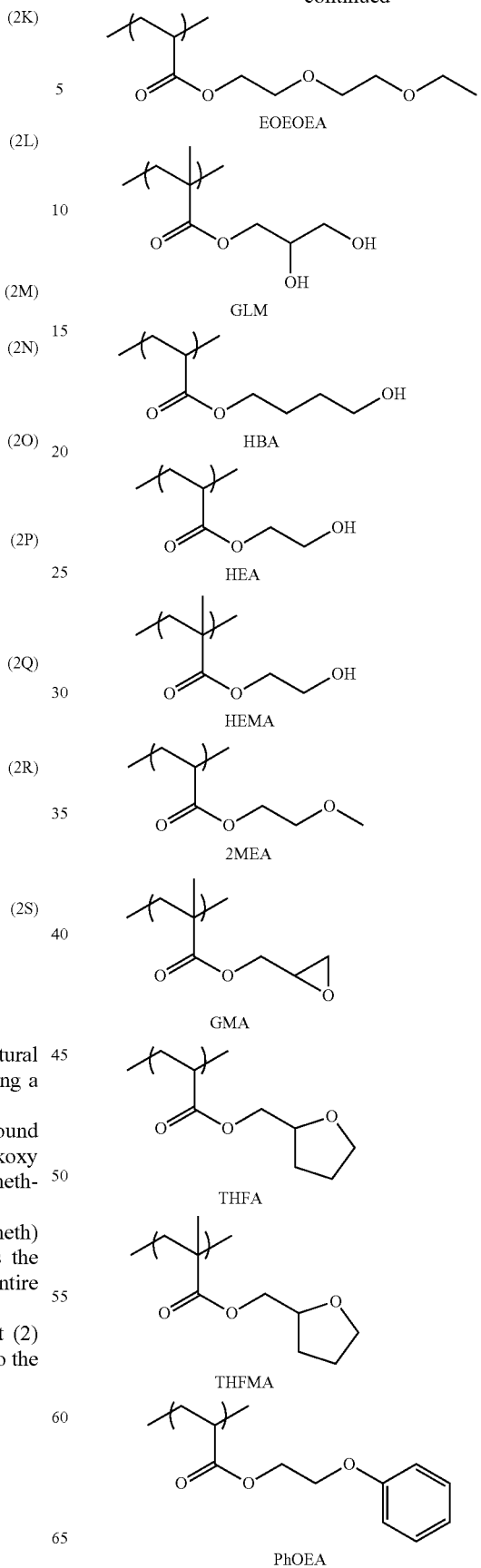

It is preferable that the structural unit (2) is a structural unit derived from a (meth)acrylate compound containing a hydrophilic group.

As the hydrophilic group in the (meth)acrylate compound containing a hydrophilic group, a hydroxy group, an alkoxy group, an amino group, a methylamino group, or a dimethylamino group is preferable.

The preferred number of carbon atoms of the (meth)acrylate compound containing a hydrophilic group is the same as the preferred number of carbon atoms of the entire structural unit (2).

Hereinafter, specific examples of the structural unit (2) will be shown, but the structural unit (2) is not limited to the following specific examples.

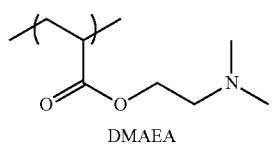

-continued

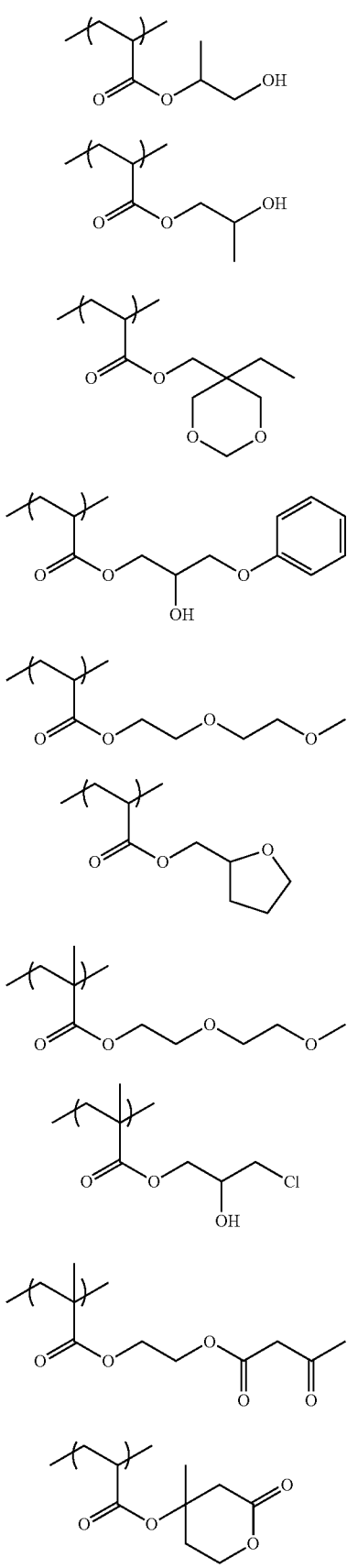

(2-1)
(2-2)
(2-3)
(2-4)
(2-5)
(2-6)
(2-7)
(2-8)
(2-9)
(2-10)

-continued (2-11) 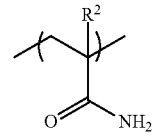

(2-12)

(2-13)

(2-14)

Structural unit (3)

(3)

In the structural unit (3), $R^2$ represents a hydrogen atom or an alkyl group having 1 to 4 carbon atoms.

$R^2$ in the structural unit (3) has the same definition as that for $R^2$ in the structural unit (1), the preferred embodiments thereof are also the same as described above.

It is preferable that the structural unit (3) is a structural unit derived from (meth)acrylamide.

Hereinafter, specific examples of the structural unit (3) will be shown, but the structural unit (3) is not limited to the following specific examples.

AAm 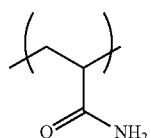

MAAm 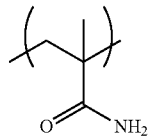

The total content of the structural unit (1) to the structural unit (3) is preferably 3% by mass or greater with respect to the entirety of the specific resin.

In a case where the total content of the structural unit (1) to the structural unit (3) is 3% by mass or greater, the adhesiveness of the image to the impermeable base material is further improved. Specifically, in a case where the total content thereof is 3% by mass or greater, the effect from at least one selected from the group consisting of the structural unit (1) to the structural unit (3) is more effectively exhibited, and thus the adhesiveness of the image to the impermeable base material is further improved. The total content of the structural unit (1) to the structural unit (3) is more preferably 5% by mass or greater and still more preferably 10% by mass or greater.

In addition, the total content of the structural unit (1) to the structural unit (3) is preferably 80% by mass or less.

In a case where the total content thereof is 80% by mass or less, remaining of the aqueous medium in the image is further suppressed, and thus a decrease in the adhesiveness of the image due to the remaining of the aqueous medium is further suppressed.

From the viewpoint of further improving the adhesiveness of the image to the impermeable base material, the total content thereof is more preferably 50% by mass or less, still more preferably 45% by mass or less, even still more preferably 40% by mass or less, and even still more preferably 35% by mass or less.

From the viewpoint of further suppressing streak unevenness of the image, it is preferable that the specific resin has at least one selected from the group consisting of the structural unit (1) and the structural unit (2).

In a case where the specific resin has at least one selected from the group consisting of the structural unit (1) and the structural unit (2), the preferable range of the total content of the structural unit (1) and the structural unit (2) is the same as the preferable range of the total content of the structural unit (1) to the structural unit (3) described above.

(Acid Group and Salt of Acid Group)

The specific resin contains at least one of an acid group or a salt of the acid group from the viewpoint of suppressing streak unevenness of the image.

In this case, the acid group and the salt of the acid group that can be contained in the specific resin may be used alone or in combination of two or more kinds thereof.

As the acid group, a carboxy group, a sulfo group, or a phosphoric acid group is preferable, a carboxy group or a sulfo group is more preferable, and a carboxy group is still more preferable.

Examples of the salt of the acid group include an alkali metal salt such as a sodium salt, a potassium salt, or a lithium salt, an alkaline earth metal salt such as a calcium salt or a magnesium salt, and an organic salt such as an ammonium salt.

The salt of the acid group is generated by neutralizing the acid group with a neutralizing agent.

Examples of the neutralizing agent for neutralizing the acid group include sodium hydroxide, potassium hydroxide, lithium hydroxide, calcium hydroxide, magnesium hydroxide, and ammonia.

The degree of neutralization of the acid group represented by the following formula in the specific resin is not particularly limited, but is preferably in a range of 20% to 100%, more preferably in a range of 40% to 100%, and still more preferably in a range of 50% to 90%.

Degree of neutralization of acid group (%)=(number of salts of acid groups/(number of acid groups+number of salts of acid groups))×100

(Acid Value)

The acid value of the specific resin (that is, the total number of millimoles of the acid group and the salt of the acid group per 1 g of the specific resin) is 0.10 mmol/g or greater and 2.65 mmol/g or less.

Since the acid value of the specific resin is 0.10 mmol/g or greater, the wettability of the image with respect to the impermeable base material is improved, and as a result, the streak unevenness of the image is suppressed. From the viewpoint of further suppressing the streak unevenness in the image, the acid value of the specific resin is more preferably 0.30 mmol/g or greater and still more preferably 0.40 mmol/g or greater.

Further, since the acid value of the specific resin is 2.65 mmol/g or less, the drying properties of the image are improved (that is, remaining of the aqueous medium in the image is suppressed), and thus the adhesiveness of the image to the impermeable base material is improved. From the viewpoint of further improving the adhesiveness of the image, the acid value of the specific resin is preferably 2.50 mmol/g or less, more preferably 2.20 mmol/g or less, still more preferably 2.00 mmol/g or less, and even still more preferably 1.85 mmol/g or less.

The acid value of the specific resin can be measured by neutralization titration using a base such as KOH or NaOH.

In a case where the specific resin contains salts of acid groups, the acid value is measured by neutralization titration in a state where all the salts of the acid groups are returned to the acid groups by adding a strong acid (for example, hydrochloric acid).

(Structural Unit Having at Least One of Acid Group or Salt of Acid Group)

It is preferable that the specific resin has a structural unit containing at least one of an acid group or a salt of the acid group (hereinafter, also referred to as an "acid group unit").

In a case where the specific resin has an acid group unit, the acid group unit contained in the specific resin may be used alone or in combination of two or more kinds thereof.

In the case where the specific resin has an acid group unit, from the viewpoint of further decreasing the streak unevenness of the image, the content of the acid group unit is preferably 1% by mass or greater more preferably 3% by mass or greater, and still more preferably 5 by mass or greater with respect to the entirety of the specific resin.

In the case where the specific resin has an acid group unit, from the viewpoint of further improving the adhesiveness of the image, the content of the acid group unit is preferably 22% by mass or less, more preferably 20% by mass or less, still more preferably 18% by mass or less, and even still more preferably 15% by mass or less with respect to the entirety of the specific resin.

From the viewpoint of the adhesiveness of the image, it is preferable that the acid group unit (that is, the structural unit containing at least one of an acid group or a salt of the acid group) is at least one selected from the group consisting of the following structural unit (4), the following structural unit (5), and the following structural unit (6) (in the present disclosure, also referred to as "the structural unit (4) to the structural unit (6)", "the units (4) to (6)", or the like).

It is particularly preferable that the acid group unit has the following structural unit (4).

(4)

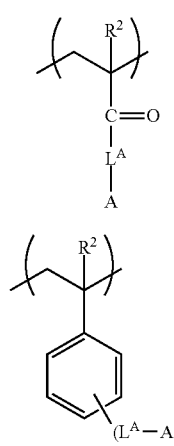

In the structural unit (4) to the structural unit (6), $R^2$ represents a hydrogen atom or an alkyl group having 1 to 4 carbon atoms, $L^A$ represents a divalent group which is one selected from the third group consisting of an alkylene group having 1 to 30 carbon atoms, an arylene group having 6 to 10 carbon atoms, —O—, —NH—, —S—, —C(=O)—, and —CH(—OH)—, a divalent group which is obtained by combining two or more selected from the third group, or a single bond, A represents an acid group or a salt of the acid group, and n represents an integer of 1 to 5.

$R^2$ in the structural unit (4) to the structural unit (6) has the same definition as that for $R^2$ in the structural unit (1), and the preferred embodiments thereof are also the same as described above.

In the structural unit (4) to the structural unit (6), $L^A$ represents a divalent group which is one selected from the third group, a divalent group which is obtained by combining two or more selected from the third group, or a single bond.

The third group consists of an alkylene group having 1 to 30 carbon atoms, an arylene group having 6 to 10 carbon atoms, —O—, —NH—, —S—, —C(=O)—, and —CH(—OH)—.

The alkylene group having 1 to 30 carbon atoms as $L^A$ may be linear or may have a branched structure.

The number of carbon atoms of the alkylene group having 1 to 30 carbon atoms as $L^A$ is preferably in a range of 1 to 12, more preferably in a range of 1 to 6, and still more preferably in a range of 1 to 4.

As the arylene group having 6 to 10 carbon atoms as $L^A$, a phenylene group or a naphthylene group is preferable, and a phenylene group is more preferable.

It is preferable that $L^A$ represents a single bond or any of the following groups.

In the following groups, *1 and *2 each represent a bonding position. Between *1 and *2, *2 represents a bonding position with respect to A.

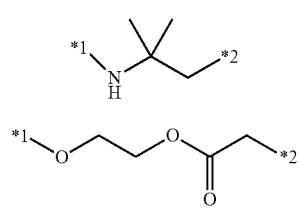

Hereinafter, specific examples of the acid group unit (that is, the structural unit containing at least one of an acid group or a salt of the acid group) will be shown.

Further, the specific examples of the acid group unit also include examples of the acid group in the following specific examples which has been neutralized (that is, the form of the salt of the acid group). For example, in a case where the specific resin has AA, the acid group (for example, a —COOH group) may be in the form of a salt (for example, —COONa) after being neutralized in at least a part of all AA contained in the specific resin. The same applies to other specific examples.

However, the acid group unit is not limited to these specific examples.

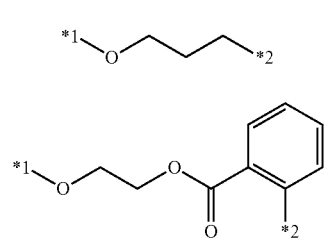

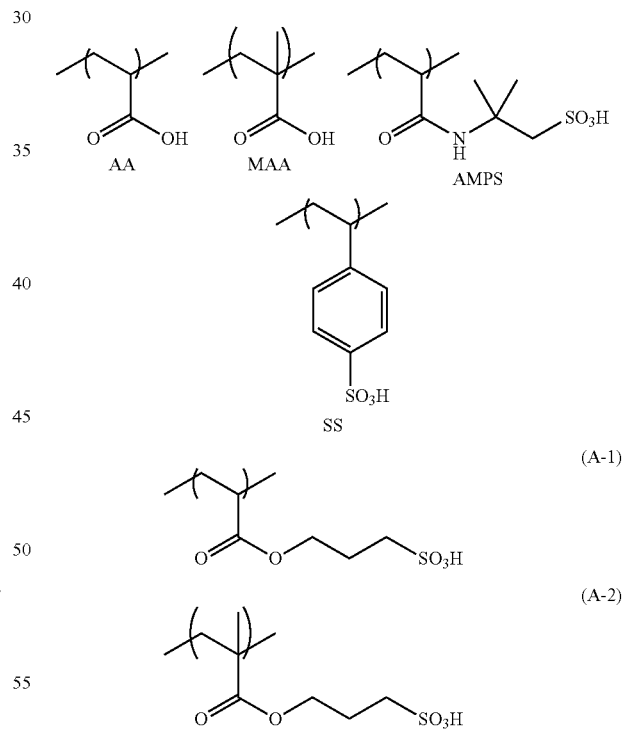

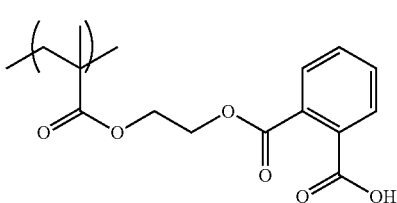

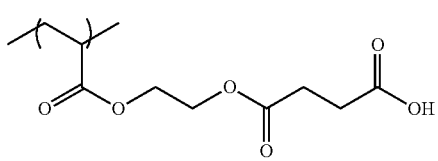

(A-4)

(Structural Unit (A) to Structural Unit (F))

It is preferable that the specific resin has at least one selected from the group consisting of the following structural unit (A), the following structural unit (B), the following structural unit (C), the following structural unit (D), the following structural unit (E), and the following structural unit (F) (in the present disclosure, also referred to as "the structural unit (A) to the structural unit (F)", "the structural units (A) to (F)" or "the units (A) to (F)").

According to the embodiment, the adhesiveness of the image to the impermeable base material is further improved.

The reason for this is considered to be that since all the structural units (A) to (F) are hydrophobic structural units, the image is hydrophobic to some extent, remaining of the aqueous medium in the image is suppressed, and thus a decrease in the adhesiveness of the image due to the remaining of the aqueous medium is further suppressed.

From the viewpoint of further improving the adhesiveness of the image, it is more preferable that the specific resin has at least one selected from the group consisting of the following structural unit (C), the following structural unit (D), the following structural unit (E), and the following structural unit (F) (hereinafter, also referred to as "the structural units (C) to (F)" or "the units (C) to (F)").

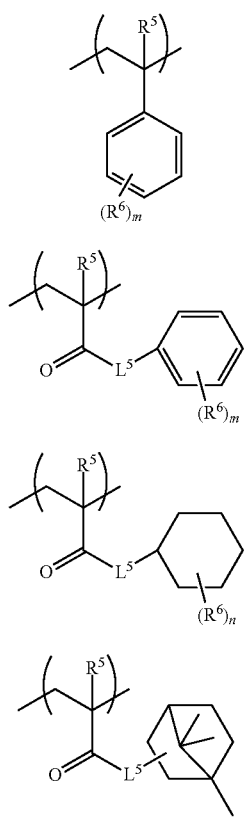

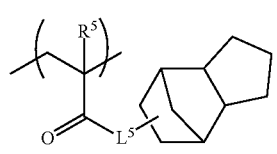

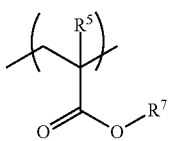

In the structural unit (A) to the structural unit (F), $R^5$ represents a hydrogen atom or a methyl group, $R^6$ represents an alkyl group, an alkenyl group, or an alkynyl group, $R^7$ represents an alkyl group having 2 to 22 carbon atoms, an alkenyl group having 2 to 22 carbon atoms, or an alkynyl group having 2 to 22 carbon atoms, m represents an integer of 0 to 5, n represents an integer of 0 to 11, and $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond.

In the structural unit (A) to the structural unit (F), the number of carbon atoms of the alkyl group represented by $R^6$ is preferably in a range of 1 to 4, more preferably 1 or 2, and still more preferably 1.

In the structural unit (A) to the structural unit (F), the number of carbon atoms in each of the alkenyl group and the alkynyl group represented by $R^6$ is preferably in a range of 2 to 4, more preferably 2 or 3, and still more preferably 2.

Further, $R^6$ may represent an unsubstituted group or a group substituted with a substituent. In a case where $R^6$ is substituted with a substituent, examples of the substituent include a halogen (such as a chlorine atom or a bromine atom) and an alkyl group (such as a methyl group or an ethyl group).

In the structural unit (A) to the structural unit (F), m represents the number of substituents ($R^6$) for a benzene ring in each of the structural unit (A) and the structural unit (B).

Further, m represents an integer of 0 to 5, preferably an integer of 0 to 3, more preferably an integer of 0 to 2, and still more preferably 0 or 1.

In the structural unit (A) to the structural unit (F), n represents the number of substituents ($R^6$) for a cyclohexane ring in the structural unit (C).

Further, n represents an integer of 0 to 11, preferably an integer of 0 to 6, more preferably an integer of 0 to 2, and still more preferably 0 or 1.

In the structural unit (A) to the structural unit (F), $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond.

The alkylene group having 1 to 18 carbon atoms as $L^5$ may be linear or may have a branched structure.

The number of carbon atoms of the alkylene group having 1 to 18 carbon atoms as $L^5$ is preferably in a range of 1 to 12, more preferably in a range of 1 to 6, and still more preferably 1 or 2.

Examples of the arylene group having 6 to 18 carbon atoms include a phenylene group, a naphthylene group, and a tolyl group.

The number of carbon atoms of the arylene group having 6 to 18 carbon atoms as $L^5$ is preferably in a range of 6 to 12 and more preferably in a range of 6 to 10.

As the "divalent group which is obtained by combining two or more selected from the fourth group" as $L^5$, a divalent group formed by combining at least one of an alkylene group having 1 to 18 carbon atoms or an arylene group having 6 to 18 carbon atoms with at least one of —O—, —NH—, —S—, or —C(=O)— is preferable, and the following group (AO5) or the following group (AO6) is particularly preferable.

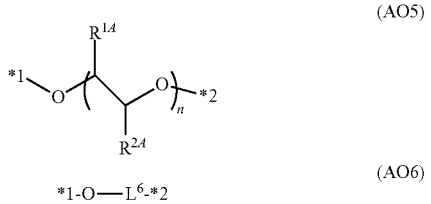

(AO5)

(AO6)

In the group (AO5), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to a carbonyl carbon atom, and *2 represents a bonding position with respect to a non-carbonyl carbon atom.

It is preferable that in a case where one of $R^{1A}$ and $R^{2A}$ represents a methyl group, the other represents a hydrogen atom.

In the group (AO6), $L^6$ represents an alkylene group having 1 to 8 carbon atoms (preferably 1 to 4 carbon atoms and more preferably 1 or 2 carbon atoms), *1 represents a bonding position with respect to a carbonyl carbon atom, and *2 represents the bonding position with respect to a non-carbonyl carbon atom.

It is preferable that $L^5$ represents a single bond, —O—, the group (AO5), or the group (AO6).

In the structural unit (F), $R^7$ represents an alkyl group having 2 to 22 carbon atoms, an alkenyl group having 2 to 22 carbon atoms, or an alkynyl group having 2 to 22 carbon atoms.

These groups represented by $R^7$ may be linear or may have a branched structure.

The number of carbon atoms in each of these groups represented by $R^7$ is independently preferably in a range of 2 to 16 and more preferably in a range of 2 to 10.

Hereinafter, specific examples of the structural unit (A) will be shown, but the structural unit (A) is not limited to the following specific examples.

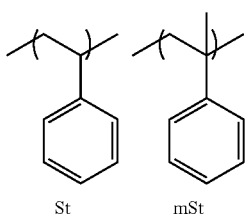

St            mSt

Hereinafter, specific examples of the structural unit (B) will be shown, but the structural unit (B) is not limited to the following specific examples.

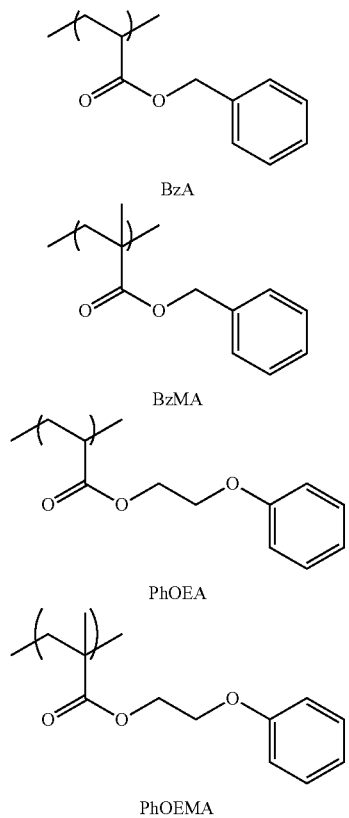

BzA

BzMA

PhOEA

PhOEMA

Hereinafter, specific examples of the structural unit (C) will be shown, but the structural unit (C) is not limited to the following specific examples.

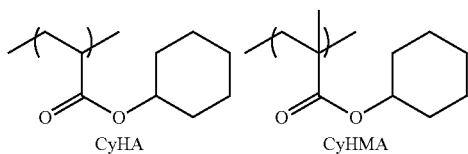

CyHA            CyHMA

Hereinafter, specific examples of the structural unit (D) will be shown, but the structural unit (D) is not limited to the following specific examples.

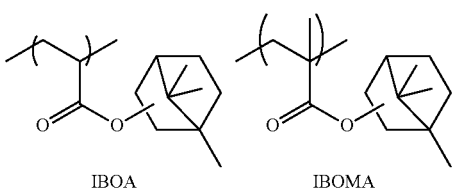

IBOA            IBOMA

Hereinafter, specific examples of the structural unit (E) will be shown, but the structural unit (E) is not limited to the following specific examples.

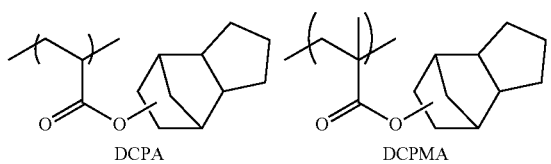

Hereinafter, specific examples of the structural unit (F) will be shown, but the structural unit (F) is not limited to the following specific examples.

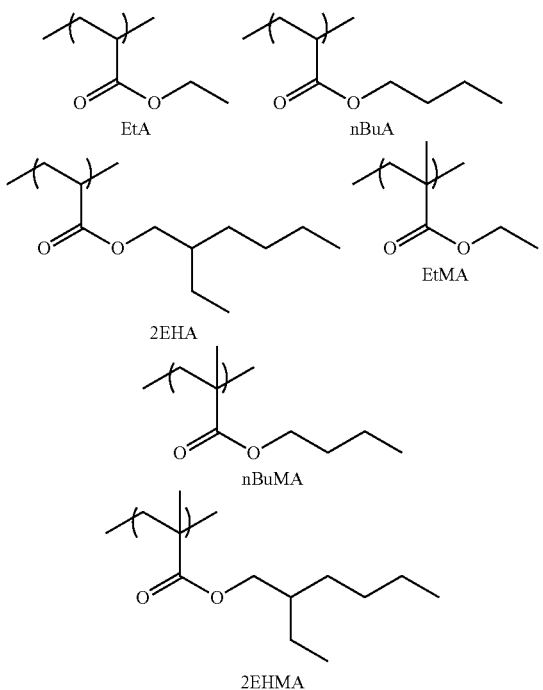

The total content of the structural units (1) to (3) and the structural units (A) to (F) in the specific resin is preferably 70% by mass or greater with respect to the entirety of the specific resin.

According to such a preferred embodiment, the adhesiveness of the image is further improved.

The total content of the structural units (1) to (3) and the structural units (A) to (F) is more preferably 75% by mass or greater and still more preferably 80% by mass or greater with respect to the entirety of the specific resin.

The upper limit of the total content of the structural units (1) to (3) and the structural units (A) to (F) depends on the amount of other structural units and is, for example, 95% by mass with respect to the entirety of the specific resin.

Further, from the viewpoint of further improving the adhesiveness of the image, the total content of the structural units (A) to (F) in the specific resin is preferably 5% by mass or greater and more preferably 10% by mass or greater with respect to the entirety of the specific resin.

The upper limit of the total content of the structural units (A) to (F) depends on the amount of other structural units and is, for example, 90% by mass, preferably 80% by mass, more preferably 70% by mass, still more preferably 60% by mass, even still more preferably 50% by mass, even still more preferably 40% by mass, and even still more preferably 35% by mass with respect to the entirety of the specific resin.

Further, from the viewpoint of further improving the adhesiveness of the image, the ratio of the total content of the structural units (A) to (F) to the total content of the structural units (1) to (3) in the specific resin (that is, the total content ratio [structural units (A) to (F)/structural units (1) to (3)]) is preferably in a range of 0.2 to 35, more preferably in a range of 0.2 to 32, still more preferably 0.2 to 20, even still more preferably in a range of 0.2 to 12, and even still more preferably in a range of 0.2 to 5.0.

From the viewpoint of further improving the adhesiveness of the image and further suppressing the streak unevenness of the image, the specific resin has preferably at least one selected from the group consisting of the structural unit (A) to the structural unit (E) and more preferably at least one selected from the group consisting of the structural unit (C) to the structural unit (E).

In a case where the specific resin has at least one selected from the group consisting of the structural unit (A) to the structural unit (E), the preferable ranges of the total content of the structural units (1) to (3) and the structural units (A) to (E), the total content ratio [structural units (A) to (E)/structural units (1) to (3)], and the total content of the structural units (A) to (E) are respectively the same as the preferable ranges of the total content of the structural units (1) to (3) and the structural units (A) to (F), the total content ratio [structural units (A) to (F)/structural units (1) to (3)], and the total content of the structural units (A) to (F) described above.

In a case where the specific resin has at least one selected from the group consisting of the structural unit (C) to the structural units (E), the preferable ranges of the total content of the structural units (1) to (3) and the structural units (C) to (E), the total content ratio [structural units (C) to (E)/structural units (1) to (3)], and the total content of the structural units (C) to (E) are respectively the same as the preferable ranges of the total content of the structural units (1) to (3) and the structural units (A) to (F), the total content ratio [structural units (A) to (F)/structural units (1) to (3)], and the total content of the structural units (A) to (F) described above.

(Structural Unit Derived from Alkyl (Meth)Acrylate Containing Chain Alkyl Group Having 2 or More Carbon Atoms)

From the viewpoint of further suppressing the streak unevenness of the image, the content of the structural unit derived from an alkyl (meth)acrylate containing a chain alkyl group having 2 or more carbon atoms (that is, a linear or branched alkyl group) in the specific resin (hereinafter, also referred to as a "C2 or more chain alkyl group unit") is preferably 5% by mass or less, more preferably 4% by mass or less, still more preferably 3% by mass or less, and even still more preferably 0% by mass (that is, the specific resin does not have a C2 or more chain alkyl group unit) with respect to the entirety of the specific resin.

The reason why the streak unevenness of the image is suppressed in a case where the content of the C2 or more chain alkyl group unit in the specific resin is 5% by mass or less is assumed as follows.

The C2 or more chain alkyl group unit is considered to have an effect of decreasing the wettability of the ink with respect to the impermeable base material.

Therefore, the streak unevenness of the image due to the decrease in the wettability of the ink with respect to the impermeable base material is considered to be suppressed by limiting the content of the C2 or more chain alkyl group unit in the specific resin to 5% by mass or less.

The C2 or more chain alkyl group unit and the structural unit (F) described above are partially common.

That is, the above-described structural unit (F) contributes to the improvement of the adhesiveness of the image to the impermeable base material as described above, but from the viewpoint of further suppressing the streak unevenness of the image, the content of the structural unit (F) is preferably 5% by mass or less, more preferably 4% by mass or less, still more preferably 3% by mass or less, and even still more preferably 0% by mass (that is, the specific resin does not have a C2 or more chain alkyl group unit) with respect to the entirety of the specific resin.

Specific examples of the C2 or more chain alkyl group unit include the above-described specific examples of the structural unit (F).

(Other Structural Units)

The specific resin may have structural units other than the structural units described above.

As the other structural units, structural units derived from a (meth)acrylate compound and excluding the structural units described above are preferable, and structural units derived from methyl (meth)acrylate (that is, MA and MMA shown below) are more preferable.

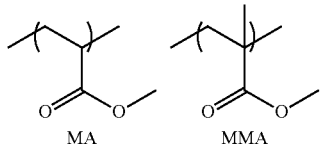

MA          MMA

The weight-average molecular weight (Mw) of the specific resin is preferably in a range of 3000 to 2000000, more preferably in a range of 10000 to 1500000, still more preferably in a range of 10000 to 1000000, and even still more preferably in a range of 30000 to 200000.

In a case where the weight-average molecular weight of the specific resin is 3000 or greater, the adhesiveness of the image to the impermeable base material is further improved.

In a case where the weight-average molecular weight of the specific resin is 2000000 or less, the dispersion stability of the specific resin is further improved.

In the present disclosure, the weight-average molecular weight (Mw) indicates a value measured by gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μL, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The volume average particle diameter of the specific resin particles is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering type particle size distribution analyzer.

As a measuring device, a particle size distribution measuring device "MICROTRAC MT-3300II" (manufactured by Nikkiso Co., Ltd.) is exemplified.

In regard to the specific resin particles, the description in paragraphs 0137 to 0171 of WO2017/163738A and paragraphs 0036 to 0081 of JP2010-077218A may be referred to.

The content of the specific resin particles in the ink of the present disclosure is preferably in a range of 1% by mass to 25% by mass, more preferably in a range of 2% by mass to 20% by mass, still more preferably in a range of 3% by mass to 15% by mass, and even still more preferably in a range of 5% by mass to 15% by mass with respect to the total amount of the ink.

In a case where the content of the specific resin particles is 1% by mass or greater, the adhesiveness of the image to the impermeable base material is further improved.

In a case where the content of the specific resin particles is 25% by mass or less, the viscosity of the ink is further decreased and the ink applying property is further improved.

<Colorant>

The ink of the present disclosure may contain a colorant.

An organic pigment or an inorganic pigment is preferable as the colorant.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, barium yellow, cadmium red, chrome yellow, and carbon black.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, still more preferably in a range of 5% by mass to 20% by mass, and particularly preferably in a range of 5% by mass to 15% by mass with respect to the total amount of the ink.

<Dispersant>

The ink of the present disclosure may contain a dispersant used for dispersing the colorant.

As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

<Surfactant>

The ink of the present disclosure may contain at least one surfactant.

The surfactant can be used as a surface tension adjuster or an antifoaming agent. Examples of the surface tension adjuster or the antifoaming agent include a nonionic surfactant, a cationic surfactant, an anionic surfactant, and a betaine surfactant. Among these, from the viewpoint of the aggregation rate of the ink, a nonionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

For example, the content of the surfactant is preferably 0.1% by mass or greater, more preferably 0.1% by mass to 10% by mass, and still more preferably 0.2% by mass to 3% by mass with respect to the total amount of the ink.

<Other Components>

The ink of the present disclosure may contain components other than the components described above.

Examples of other components include a water-soluble resin (such as a water-soluble acrylic resin, a water-soluble urethane resin, a water-soluble polyolefin resin, a water-soluble polyalkylene oxide resin, or a water-soluble polyester resin), a discoloration inhibitor, an emulsification stabilizer, a penetration enhancer, an ultraviolet absorbing agent, a preservative, an antibacterial agent, a pH adjuster, a surface tension adjuster, an antifoaming agent, a viscosity adjuster, a rust inhibitor, and a chelating agent.

The ink of the present disclosure is an ink used for a known application method such as a coating method, an inkjet method, or a dipping method and is not particularly limited.

It is preferable that the ink of the present disclosure is an ink used for an inkjet method, that is, an inkjet ink.

<Preferable Physical Properties of Ink>

The viscosity of the ink of the present disclosure at 30° C. is preferably 1.2 mPa·s or greater and 15.0 mPa·s or less, more preferably 2 mPa·s or greater and less than 13 mPa·s, and still more preferably 2.5 mPa·s or greater and less than 10 mPa·s.

As the viscometer used for measuring the viscosity, for example, a VISCOMETER TV-22 type viscometer (manufactured by Toki Sangyo Co., Ltd.) can be used.

From the viewpoint of the dispersion stability, the pH of the ink of the present disclosure at 25° C. is preferably in a range of 6 to 11, more preferably in a range of 7 to 10, and still more preferably in a range of 7 to 9.

Here, the pH is a value measured using a commercially available pH meter.

[Image Recording Method]

An image recording method of the present disclosure includes a step of applying the ink of the present disclosure onto an impermeable base material to record an image (hereinafter, also referred to as an "image recording step").

The image recording method of the present disclosure may include other steps as necessary.

The impermeable base material is as described above.

In the image recording step, the ink is applied onto the impermeable base material directly or via another layer.

In a case where the ink is applied onto the impermeable base material via another layer, for example, a pretreatment liquid containing an aggregating agent and water is applied onto the impermeable base material to form a pretreatment layer as another layer prior to the ink applying step, and the ink is applied onto the impermeable base material via this pretreatment layer. Examples of the pretreatment liquid include a pretreatment liquid containing resin particles, an aggregating agent (specifically, at least one aggregating agent selected from the group consisting of a polyvalent metal salt, an organic acid or a salt thereof, and a metal complex), and water, which is described in WO2019/004485A.

However, according to the ink of the present disclosure, an image having excellent adhesiveness to the impermeable base material can be recorded even in an aspect in which the ink is applied directly onto the impermeable base material without another layer.

In other words, the effect of the ink of the present disclosure that enables recording of an image with excellent adhesiveness to an impermeable base material is particularly effectively exhibited in the aspect in which the ink is applied directly onto the impermeable base material without another layer.

As the method of applying the ink in the image recording step, a known method such as a coating method, an inkjet method, or a dipping method can be employed.

Among these, an inkjet method is preferable.

The method of jetting the ink in the inkjet method is not particularly limited, and any of known methods such as an electric charge control method of jetting an ink using an electrostatic attraction force, a drop-on-demand method (pressure pulse method) using a vibration pressure of a piezoelectric element, an acoustic inkjet method of jetting an ink using a radiation pressure by converting an electric signal into an acoustic beam and irradiating the ink with the acoustic beam, and a thermal inkjet (bubble jet (registered trademark)) method of heating an ink to form air bubbles and using the generated pressure may be used.

As the inkjet method, particularly, an inkjet method, described in JP1979-59936A (JP-S54-59936A), of jetting an ink from a nozzle using an action force caused by a rapid change in volume of the ink after being subjected to an action of thermal energy can be effectively used.

Further, as the inkjet method, the method described in paragraphs 0093 to 0105 of JP2003-306623A can also be employed.

The application of the ink onto the impermeable base material according to the inkjet method can be performed by allowing the ink to be jetted from a nozzle of an inkjet head.

Examples of the system of the inkjet head include a shuttle system of performing recording while scanning a short serial head in the width direction of a recorded medium and a line system of using a line head in which recording elements are aligned in correspondence with the entire area of one side of a recorded medium.

In the line system, image recording can be performed on the entire surface of the recorded medium by scanning the recorded medium in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the ink is performed using an inkjet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the liquid droplet amount of the ink to be jetted from the nozzle of the inkjet head is preferably in a range of 1 pico liter (pL) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

In the image recording step, an image may be obtained by heating and drying the ink which has been applied onto the impermeable base material.

Examples of the means for heating and drying the ink include known heating means such as a heater, known air blowing means such as a dryer, and means for combining these.

Examples of the method for heating and drying the ink include a method of applying heat using a heater or the like from a side of the impermeable base material opposite to the surface onto which the ink has been applied, a method of applying warm air or hot air to the surface of the impermeable base material onto which the ink has been applied, a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the impermeable base material may be heated in advance before the application of the ink.

The heating temperature may be appropriately set, but the temperature of the impermeable base material is set to be preferably in a range of 20° C. to 50° C. and more preferably in a range of 25° C. to 40° C.

In the image recording step, two or more colors of inks may be applied onto the impermeable base material to record an image of two or more colors.

EXAMPLES

Hereinafter, examples of the present disclosure will be described below, but the present disclosure is not limited to the following examples.

Further, "%" indicates % by mass unless otherwise specified.

In the description below, a structural unit (1) may be simply referred to as a "unit (1)". The same applies to other structural units.

<Synthesis of Resin Particles 1>

Resin particles 1, which are an example of specific resin particles, were synthesized. Hereinafter, the details will be described.

A 2 L three-neck flask provided with a stirrer, a thermometer, a reflux cooling pipe, and a nitrogen gas introduction pipe was charged with 281.0 g of methyl ethyl ketone, and the solution was heated to 80° C. A mixed solution consisting of 98.2 g of benzyl methacrylate, 95.2 g of isobornyl methacrylate, 74.4 g of hydroxyethyl methacrylate, 29.8 g of methacrylic acid, 44 g of methyl ethyl ketone, and 1.32 g of "V-601" (oil-soluble azo polymerization initiator, manufactured by Fujifilm Wako Pure Chemical Corporation, the same applies hereinafter) was added dropwise to the reaction container at a constant speed such that the dropwise addition was completed for 2 hours while the temperature inside the reaction container was maintained at 80° C. After completion of the dropwise addition, the solution was stirred for 1 hour while the temperature inside the reaction container was maintained at 80° C.

Next, a solution consisting of 0.60 g of "V-601" and 5.0 g of methyl ethyl ketone was added to the reaction container, and the solution was stirred for 2 hours. This step was repeatedly performed 4 times. Thereafter, a solution consisting of 0.60 g of "V-601" and 5.0 g of methyl ethyl ketone was added thereto and the resulting solution was stirred for 3 hours, thereby obtaining a copolymer solution.

163.52 g of the above-described copolymer solution was weighed, 105 g of isopropanol, 1.0 g of a 20% maleic acid aqueous solution, and a 2 mol/L NaOH aqueous solution (amount at which the degree of neutralization of the carboxy group of the copolymer reached 50%) were added to the copolymer solution, and the temperature inside the reaction container was increased to 80° C. Next, 194 g of distilled water was added dropwise to the reaction container at a rate of 20 mL/min for dispersion in water. Thereafter, the temperature inside the reaction container was maintained at 80° C. for 2 hours, the temperature inside the reaction container was maintained at 85° C. for 2 hours, and the temperature inside the reaction container was maintained at 90° C. for 2 hours under atmospheric pressure to distill off the solvent. Next, the pressure inside of the reaction container was reduced to distill off isopropanol and methyl ethyl ketone, and distilled water was added thereto, thereby obtaining an aqueous dispersion of resin particles 1 having a concentration of the solid content of 25.0%. In the above-described decompression operation, the isopropanol and methyl ethyl ketone were completely distilled off.

The glass transition temperature (Tg), the acid value, and the weight-average molecular weight (Mw) of the resin of the resin particles 1 and the particle diameter (that is, the volume average particle diameter) of the resin particles 1 are as listed in Table 2.

<Synthesis of Resin Particles 2 to 16, 18 to 43, 46 to 51, 53, 54, and 56 to 58 (Resin Particles in Each Example)>

Resin particles in each example were obtained by performing the same operation as that for the synthesis of the resin particles 1 except that the kind and the amount of the raw material monomer were changed so that the kind and the amount of each unit were changed as listed in Table 1 and Table 2.

The glass transition temperature (Tg), the acid value, and the weight-average molecular weight (Mw) of the resin of each kind of resin particles, and the particle diameter (that is, the volume average particle diameter) of each kind of resin particles are as listed in Table 2.

<Synthesis of Resin Particles 17, 44, 45, 52, and 55 (Resin Particles in Each Comparative Example)>

Resin particles in each comparative example were obtained by performing the same operation as that for the synthesis of the resin particles 1 except that the kind and the amount of the raw material monomer were changed so that the kind and the amount of each unit were changed as listed in Table 1 and Table 2.

The glass transition temperature (Tg), the acid value, and the weight-average molecular weight (Mw) of the resin of each kind of resin particles, and the particle diameter (that is, the volume average particle diameter) of each kind of resin particles are as listed in Table 2.

The structure of each unit listed in Tables 1 and Table 2 is as described above.

Here, PP800 indicates a structural unit derived from BLEMMER (registered trademark) PP-800 (manufactured by NOF Corporation), and AS6S indicates a structural unit derived from styrene macromonomer AS-6S (manufactured by Toagosei Co., Ltd.).

DMAPAA indicates the following structural unit, which is a structural unit containing a cationic group instead of an acid group.

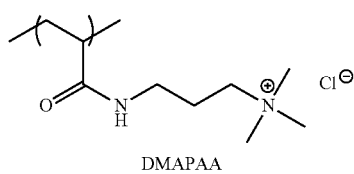

DMAPAA

Table 3 shows the total amount of the unit (1) to the unit (3), the amount (%) of the C2 or more chain alkyl group unit, the amount of the acid group unit, the glass transition temperature (Tg), and the acid value of the resin of each kind of resin particles.

Here, the "C2 or more chain alkyl group unit" indicates a structural unit derived from an alkyl (meth)acrylate containing a chain alkyl group having 2 or more carbon atoms.

Further, the amount of each unit indicates the content (% by mass) of each unit with respect to the entirety of the resin.

Example 1

<Preparation of Black Ink K-01>
—Synthesis of Water-Insoluble Polymer Dispersant—

A mixed solution of 6 parts of styrene, 11 parts of stearyl methacrylate, 4 parts of styrene macromer AS-6 (manufactured by Toagosei Co., Ltd.), 5 parts of BLEMMER PP-500 (manufactured by NOF Corporation), 5 parts of methacrylic acid, 0.05 parts of 2-mercaptoethanol, and 24 parts of methyl ethyl ketone was prepared in a reaction container.

Further, a mixed solution of 14 parts of styrene, 24 parts of stearyl methacrylate, 9 parts of styrene macromer AS-6 (manufactured by Toagosei Co., Ltd.), 9 parts of BLEMMER PP-500 (manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) was prepared and poured into a dropping funnel.

Next, the mixed solution in the reaction container was heated to 75° C. while being stirred in a nitrogen atmosphere, and the mixed solution in the dropping funnel was slowly added dropwise thereto over 1 hour. After 2 hours from the completion of the dropwise addition, a solution prepared by dissolving 1.2 parts of 2,2'-azobis(2,4-dimethylvaleronitrile) in 12 parts of methyl ethyl ketone was added dropwise thereto over 3 hours, and the solution was aged at 75° C. for 2 hours and further aged at 80° C. for 2 hours, thereby obtaining a methyl ethyl ketone solution of a water-insoluble polymer dispersant.

A part of the obtained water-insoluble polymer dispersant solution was isolated by removing the solvent, the obtained solid content was diluted to 0.1% by mass with tetrahydrofuran, and the weight-average molecular weight thereof was measured by GPC. As a result, the isolated solid content had a weight-average molecular weight of 25000.
—Preparation of Black Pigment Dispersion Liquid—

5.0 g of the obtained water-insoluble polymer dispersant solution in terms of solid content, 10.0 g of pigment dispersion CAB-O-JET™ 200 (carbon black, manufactured by Cabot Corporation), 40.0 g of methyl ethyl ketone, 8.0 g of 1 mol/L sodium hydroxide, 82.0 g of ion exchange water, and 300 g of 0.1 mm zirconia beads were supplied to a vessel and dispersed at 1000 rpm for 6 hours with a ready mill disperser (manufactured by AIMEX Co., Ltd.). The obtained dispersion liquid was concentrated under reduced pressure with an evaporator until the methyl ethyl ketone was sufficiently distilled off. The concentration of carbon black was adjusted to 10% by mass by adding water to the obtained concentrate, thereby obtaining a black pigment dispersion liquid BK-1 as a dispersion liquid of coloring particles formed of a pigment whose surface was coated with a water-insoluble polymer dispersant.
—Preparation of Black Ink K-01—

The black pigment dispersion liquid BK-1, the aqueous dispersion of the resin particles 1 prepared in the above-described manner, water, and propylene glycol (PG) (water-soluble organic solvent) were mixed to obtain a mixture. Black ink K-01 having the following composition was obtained by removing coarse particles from the obtained mixture using a 1 μm filter.

In the composition below, the proportion (% by mass) of water in the aqueous medium and the proportion (% by mass) of the water-soluble organic solvent (here, PG) in the aqueous medium are as listed in Table 3.
—Composition of Black Ink K-01—
  Solid content of black pigment dispersion liquid BK-1 . . . 4.5% by mass (3.0% by mass in terms of content of carbon black)
  Solid content of resin fine particle aqueous dispersion (resin particles 1) . . . 8% by mass
  Olefin E1010 (manufactured by Nissin Chemical Co., Ltd.) . . . 1% by mass
  Aqueous medium (water and PG) . . . remaining amount set such that total amount of composition was 100% by mass <Image Recording>

An inkjet recording device comprising a transport system for continuously transporting a long impermeable base material and an inkjet head for applying an ink onto the continuously transported impermeable base material was prepared.

Further, a biaxially stretched polypropylene (OPP) base material ("P6181", manufactured by Toyobo Co., Ltd.; thickness of 25 μm, width of 500 mm, length of 2000 m) (hereinafter, referred to as an "impermeable base material A") was prepared as the impermeable base material.

A black solid image was recorded in the following manner while the impermeable base material A was continuously transported at 635 mm/sec using an inkjet recording device.

The black ink K-01 (hereinafter, simply referred to as "the ink") was applied onto the impermeable base material A in the form of a solid image under the following application conditions, and the applied ink was dried at 80° C. for 30 seconds, thereby recording a black solid image.

Warm air drying was used as the method of drying the ink.
—Ink Application Conditions—
  Ink jet head: 1200 dpi/20 inch-width piezo full line head (here, dpi stands for dot per inch, and 1 inch is 2.54 cm.)
  Amount of ink to be jetted from inkjet head: 4.0 μL
  Driving frequency: 30 kHz (transport speed of base material: 635 mm/sec)

<Evaluation of Adhesiveness>

Next, the adhesiveness of the image was evaluated by attaching a piece of Cellotape (registered trademark, No. 405, manufactured by Nichiban Co., Ltd., width of 12 mm, hereinafter, also simply referred to as "tape") onto the solid image after 1 minute from the recording of the solid image (that is, drying of the solid image at 80° C. for 30 seconds) and peeling the piece of tape off from the solid image.

Specifically, the tape was attached and peeled off according to the following method.

The tape was taken out at a constant speed and cut to have a length of approximately 75 mm, thereby obtaining a piece of tape.

The obtained piece of tape was superimposed on the solid image, and a region at the central portion of the piece of tape with a width of 12 mm and a length of 25 mm was attached onto the image using a finger and rubbed firmly with a fingertip. Here, in the solid image, the region with a width of 12 mm and a length of 25 mm to which a piece of tape was attached is hereinafter referred to as an "evaluation region".

The end of the piece of tape was grabbed in 5 minutes after attachment of the piece of tape and peeled at an angle as close to 60° as possible in 0.5 seconds to 1.0 seconds.

Next, the area ratio (%) of the image remaining on the impermeable base material with respect to the entire evaluation region of the solid image was acquired, and the adhesiveness of the image was evaluated based on the following evaluation standards.

The results are listed in Table 3.

In the following evaluation standards, the rank with the most excellent adhesiveness of the image is set as "A".

—Evaluation Standards for Adhesiveness of Image—
- A: The area ratio (%) of the image remaining on the impermeable base material was 90% greater and 100% or less.
- B: The area ratio (%) of the image remaining on the impermeable base material was 70% or greater and less than 90%.
- C: The area ratio (%) of the image remaining on the impermeable base material was 50% or greater and less than 70%.
- D: The area ratio (%) of the image remaining on the impermeable base material was 30% or greater and less than 50%.
- E: The area ratio (%) of the image remaining on the impermeable base material was less than 30%.

<Evaluation of Streak Unevenness of Image>

A region having a size of 50 mm (the transport direction of the impermeable base material)×20 mm (a direction orthogonal to the transport direction of the impermeable base material) in the solid image was set as a "streak unevenness evaluation region".

The streak unevenness evaluation region in the solid image was visually observed, the presence or absence of streak unevenness in parallel with the transport direction of the impermeable base material and the degree of the occurrence of the streak unevenness were confirmed, and the streak unevenness of the image was evaluated based on the following evaluation standards.

The results are listed in Table 3.

In the following evaluation standards, the rank in which the streak unevenness of the image was most suppressed is set as "A".

Further, in the following evaluation standards, the streak unevenness which was able to be easily visually recognized is streak unevenness that was able to be visually recognized in a case of being observed at a position separated by 50 cm.

—Evaluation Standards for Streak Unevenness of Image—
- A: The occurrence of streak unevenness was not visually recognized in the solid image.
- B: One extremely thin uneven streak was visually confirmed in the solid image (streak unevenness which was able to be easily visually recognized was not confirmed).
- C: Two or more extremely thin uneven streaks were confirmed in the solid image (streak unevenness which was able to be easily visually recognized was not confirmed).
- D: Streak unevenness which was able to be easily visually recognized was confirmed in the solid image.

Examples 2 to 37, 39 to 43, and 47 to 57

The same operation as in Example 1 was performed except that the kind of the resin particles in the ink was changed as listed in Table 3.

The results are listed in Table 3.

Example 38

The same operation as in Example 7 was performed except that the kind of the water-soluble organic solvent, the proportion of the water-soluble organic solvent in the aqueous medium, and the proportion of water in the aqueous medium were changed as listed in Table 3.

The results are listed in Table 3.

Here, "GP250" serving as the water-soluble organic solvent indicates SANNIX (registered trademark) GP250 (polyoxypropylene glyceryl ether, manufactured by Sanyo Chemical, Ltd.) and is a water-soluble organic solvent having a boiling point of 250° C. or higher.

Examples 44 to 46

The same operation as in Example 7 was performed except that the impermeable base material A (OPP base material) was changed to the following impermeable base materials B to D.

The results are listed in Table 3.

Impermeable base material B: polyethylene terephthalate (PET) base material ("FE2001", manufactured by Futamura Chemical Co., Ltd. (thickness of 25 μm, width of 500 mm, length of 2000 m))

Impermeable base material C: nylon base material ("EMBLEM ON-25", manufactured by Unitika Ltd.; thickness of 25 μm, width of 500 mm, length of 2000 m)

Impermeable base material D: polyethylene base material ("LL-RP2", manufactured by Futamura Chemical Co., Ltd., thickness of 30 μm, width of 500 mm, length of 2000 m)

Comparative Examples 1 and 3 to 6

The same operation as in Example 1 was performed except that the kind of the resin particles in the ink was changed as listed in Table 3.

The results are listed in Table 3.

Comparative Example 2

The same operation as in Example 38 was performed except that the proportion of the water-soluble organic solvent in the aqueous medium and the proportion of water in the aqueous medium were changed as listed in Table 3.

The results are listed in Table 3.

TABLE 1

| | Resin particles | | | | | | | | | |
|---|---|---|---|---|---|---|---|---|---|---|
| | Structural unit of resin (% by mass) | | | | | | | | | |
| | Unit (1) | | | | | Unit (2) | | | | |
| No. | ACMO | DAAM | DMAAm | HEAAm | NIPAM | DMAEA | EOEOEA | GLM | HBA | HEMA |
| 1 | | | | | | | | | | 25 |
| 2 | | | | | | | | | | 25 |
| 3 | | | | | | | | | | 25 |
| 4 | | | | | | | | | | 25 |
| 5 | | | | | | | | | | 25 |
| 6 | | | | | | | | | | 25 |
| 7 | | | | | | | | | | 25 |
| 8 | | | | | | | | | | 20 |
| 9 | | | | | | | | | | 25 |
| 10 | | | | | | | | | | 25 |
| 11 | | | | | | | | | | 25 |
| 12 | | | | | | | | | 25 | |
| 13 | | | | | | | | | 25 | |
| 14 | | | | | | | | | 25 | |
| 15 | | | | | | | | | 25 | |
| 16 | | | | | | | | | 25 | |
| 17 | | | | | | | | | 25 | |
| 18 | | | | | | | | | | 43 |
| 19 | | | | | | | | | | 38 |
| 20 | | | | | | | | | | 33 |
| 21 | | | | | | | | | | 28 |
| 22 | | | | | | | | | | 17 |
| 23 | | | | | | | | | | 13 |
| 24 | | | | | | | | | | 8 |
| 25 | | | | | | | | | | 3 |
| 26 | | | | | | | | | | 25 |
| 27 | | | | | | | | | | 25 |
| 28 | | | | | | | | | | 25 |
| 29 | | | | | | | | | | |
| 30 | | | | | | 25 | | | | |
| 31 | | | | | | | | | | |
| 32 | | | | | | | | | | |
| 33 | | | | | | | | 25 | | |
| 34 | | | | | | 25 | | | | |
| 35 | | | | | | | | 25 | | |
| 36 | | | | | | | | 25 | | |
| 37 | | | | | | | | 25 | | |
| 38 | | | | | | | | 25 | | |
| 39 | 20 | | | | | | | | | |
| 40 | | 15 | | | | | | | | |
| 41 | | | 20 | | | | | | | |
| 42 | | | | 20 | | | | | | |
| 43 | | | | | 25 | | | | | |
| 44 | | | | | | | | | | |
| 45 | | | | | | | | | | |
| 46 | | | | | | | | | | 25 |
| 47 | | | | | | | | | | 25 |
| 48 | | | | | | | | | | 25 |
| 49 | | | | | | | | | 25 | |
| 50 | | | | | | | | | | 25 |
| 51 | | | | | | | | | | 25 |
| 52 | | | | | | | | | | 25 |
| 53 | | | | | | | | | | 25 |
| 54 | | | | | | | | | | 25 |
| 55 | | | | | | | | | | 25 |
| 56 | | | | | | | | | | 47 |
| 57 | | | | | | | | | | 25 |
| 58 | | | | | | | | | | 25 |

| | Structural unit of resin (% by mass) | | | | | | | | |
|---|---|---|---|---|---|---|---|---|---|
| | Unit (2) | | | | Unit (3) | Total amount of units (1) to (3) | Acid group unit | | |
| No. | 2MEA | GMA | THFA | PP800 | MAAm | | MAA | SS | AMPS |
| 1 | | | | | | 25 | 10 | | |
| 2 | | | | | | 25 | 10 | | |

TABLE 1-continued

Resin particles

| No. | | | | | | | | |
|---|---|---|---|---|---|---|---|---|
| 3 | | | | | | 25 | 10 | |
| 4 | | | | | | 25 | 10 | |
| 5 | | | | | | 25 | 10 | |
| 6 | | | | | | 25 | 10 | |
| 7 | | | | | | 25 | 10 | |
| 8 | 15 | | | | | 35 | 10 | |
| 9 | | | | | | 25 | 10 | |
| 10 | | | | | | 25 | 10 | |
| 11 | | | | | | 25 | 10 | |
| 12 | | | | | | 25 | 10 | |
| 13 | | | | | | 25 | 10 | |
| 14 | | | | | | 25 | 10 | |
| 15 | | | | | | 25 | 10 | |
| 16 | | | | | | 25 | 10 | |
| 17 | | | | | | 25 | 10 | |
| 18 | | | | | | 43 | 5 | |
| 19 | | | | | | 38 | 5 | |
| 20 | | | | | | 33 | 5 | |
| 21 | | | | | | 28 | 5 | |
| 22 | | | | | | 17 | 5 | |
| 23 | | | | | | 13 | 5 | |
| 24 | | | | | | 8 | 5 | |
| 25 | | | | | | 3 | 5 | |
| 26 | | | | | | 25 | 5 | |
| 27 | | | | | | 25 | 10 | |
| 28 | | | | | | 25 | 10 | |
| 29 | | | | | 25 | 25 | 10 | |
| 30 | | | | | | 25 | 10 | |
| 31 | 25 | | | | | 25 | 10 | |
| 32 | | 20 | | | | 20 | 5 | |
| 33 | | | | | | 25 | 10 | |
| 34 | | | | | | 25 | 10 | |
| 35 | | | | | | 25 | 13 | |
| 36 | | | | | | 25 | 18 | |
| 37 | | | | | | 25 | 20 | |
| 38 | | | | | | 25 | 22 | |
| 39 | | | 10 | | | 30 | 10 | |
| 40 | 20 | | | | | 35 | 10 | |
| 41 | 15 | | | | | 35 | 10 | |
| 42 | 15 | | | | | 35 | 10 | |
| 43 | | | | | | 25 | 10 | |
| 44 | | | | 20 | | 20 | 24.5 | |
| 45 | | | | | | 0 | 10 | |
| 46 | | | | | | 25 | 10 | |
| 47 | | | | | | 25 | 10 | |
| 48 | | | | | | 25 | 10 | |
| 49 | | | | | | 25 | 10 | |
| 50 | | | | | | 25 | | 10 |
| 51 | | | | | | 25 | | | 10 |
| 52 | | | | | | 25 | | |
| 53 | | | | | | 25 | 3 | |
| 54 | | | | | | 25 | 1 | |
| 55 | | | | | | 25 | | |
| 56 | | | | | | 47 | 5 | |
| 57 | | | | | | 25 | 10 | |
| 58 | | | | | | 25 | 10 | |

TABLE 2

Resin particles (continuation of Table 1)

Structural unit of resin (% by mass) (continuation of Table 1)

| No. | Unit (A) St | Unit (B) BzA | Unit (B) BzMA | Unit (C) PhOEA | Unit (D) CyHA | Unit (D) IBOA | Unit (D) IBOMA | Unit (E) DCPA | Unit (F) Type |
|---|---|---|---|---|---|---|---|---|---|
| 1 | | 33 | | | | | 32 | | |
| 2 | | 37 | | | | | | 28 | |
| 3 | | 40 | | | | | | 25 | |
| 4 | | 45 | | | | | | 20 | |
| 5 | | | | 45 | | 20 | | | |
| 6 | | 40 | | | | | | | nBuMA |
| 7 | | 45 | | | 20 | | | | |

TABLE 2-continued

| | | | Resin particles (continuation of Table 1) | | | | |
|---|---|---|---|---|---|---|---|
| 8 | | 45 | | | 10 | | |
| 9 | 25 | | | | | | nBuA |
| 10 | | | 15 | | | | nBuA |
| 11 | | | | | 10 | | 2 EHA |
| 12 | | | | | | | nBuA |
| 13 | | | | | 15 | | nBuA |
| 14 | | | | | 15 | | nBuA |
| 15 | | | | | 10 | | nBuA |
| 16 | | | | | 5 | | nBuA |
| 17 | | | | | | | nBuA |
| 18 | | | | | 27 | | nBuA |
| 19 | | | | | 40 | | nBuA |
| 20 | | | | | 23 | | nBuA |
| 21 | | | | | 20 | | 2EHMA |
| 22 | | | | | 25 | | 2EHMA |
| 23 | | | | | 29 | | 2EHMA |
| 24 | | | | | 25 | | nBuMA |
| 25 | | | | | 30 | | nBuMA |
| 26 | | 70 | | | | | |
| 27 | | 40 | | | 22 | | EtA |
| 28 | | 36 | | | 22 | | EtA |
| 29 | | | | 55 | 10 | | |
| 30 | | | | 20 | | 30 | |
| 31 | | | | 30 | | 30 | |
| 32 | | 55 | | | 20 | | |
| 33 | | | | 35 | 30 | | |
| 34 | | 35 | | | 30 | | |
| 35 | | 35 | | | 27 | | |
| 36 | | 35 | | | 22 | | |
| 37 | | 37 | | | | 28 | |
| 38 | | 35 | | | 18 | | |
| 39 | | 20 | | | 40 | | |
| 40 | | | | 35 | | 20 | |
| 41 | | 35 | | | 20 | | |
| 42 | | 35 | | | 20 | | |
| 43 | | 30 | | | 20 | | |
| 44 | 45.5 | | | | | | |
| 45 | | 30 | | | | 20 | |
| 46 | | 35 | | | 5 | | nBuMA |
| 47 | 20 | | | | 5 | | nBuA |
| 48 | | | | | 12 | | nBuA |
| 49 | | | | | 17 | | nBuA |
| 50 | | 45 | | | 20 | | |
| 51 | | 45 | | | 20 | | |
| 52 | | 50 | | | 25 | | |
| 53 | | 47 | | | 25 | | |
| 54 | | 49 | | | 25 | | |
| 55 | | 45 | | | 20 | | |
| 56 | | | | | 27 | | nBuA |
| 57 | | | | | | | nBuA |
| 58 | | | | | | | nBuA |

| | Structural unit of resin (% by mass) (continuation of Table 1) | | | | | | | |
|---|---|---|---|---|---|---|---|---|
| | Unit (F) | Total amount of units | Other units | | Tg of resin | Acid value of resin | Mw of | Particle diameter |
| No. | Amount | (C) to (F) | Type | Amount | (° C.) | (mmol/g) | resin | (nm) |
| 1 | | 32 | | | 84 | 1.16 | 35000 | 15 |
| 2 | | 28 | | | 67 | 1.16 | 42000 | 20 |
| 3 | | 25 | | | 64 | 1.16 | 46000 | 18 |
| 4 | | 20 | | | 58 | 1.16 | 38000 | 24 |
| 5 | | 20 | | | 52 | 1.16 | 39000 | 16 |
| 6 | 25 | 25 | | | 41 | 1.16 | 41000 | 30 |
| 7 | | 20 | | | 39 | 1.16 | 40000 | 19 |
| 8 | | 10 | | | 27 | 1.16 | 34000 | 20 |
| 9 | 40 | 40 | | | 22 | 1.16 | 42000 | 21 |
| 10 | 50 | 50 | | | 2 | 1.16 | 41000 | 25 |
| 11 | 55 | 65 | | | −4 | 1.16 | 40000 | 40 |
| 12 | 48 | 48 | MMA | 17 | −18 | 1.16 | 39000 | 16 |
| 13 | 50 | 65 | | | −22 | 1.16 | 44000 | 42 |
| 14 | 50 | 65 | | | −27 | 1.16 | 42000 | 19 |
| 15 | 55 | 65 | | | −32 | 1.16 | 41000 | 17 |
| 16 | 60 | 65 | | | −37 | 1.16 | 38000 | 21 |
| 17 | 65 | 65 | | | −42 | 1.16 | 39000 | 22 |

TABLE 2-continued

Resin particles (continuation of Table 1)

| | | | | | | | | |
|---|---|---|---|---|---|---|---|---|
| 18 | 25 | 52 | | | 23 | 0.58 | 44000 | 35 |
| 19 | 17 | 57 | | | 28 | 0.58 | 40000 | 37 |
| 20 | 39 | 62 | | | 28 | 0.58 | 38000 | 29 |
| 21 | 47 | 67 | | | 38 | 0.58 | 39000 | 25 |
| 22 | 53 | 78 | | | 33 | 0.58 | 37000 | 41 |
| 23 | 53 | 82 | | | 33 | 0.58 | 41000 | 19 |
| 24 | 62 | 87 | | | 29 | 0.58 | 40000 | 41 |
| 25 | 62 | 92 | | | 26 | 0.58 | 42000 | 38 |
| 26 | | 0 | | | 30 | 0.58 | 39000 | 34 |
| 27 | 3 | 25 | | | 38 | 1.16 | 41000 | 27 |
| 28 | 7 | 29 | | | 36 | 1.16 | 44000 | 36 |
| 29 | | 10 | | | 36 | 1.16 | 37000 | 31 |
| 30 | | 30 | MMA | 15 | 37 | 1.16 | 35000 | 19 |
| 31 | | 30 | MMA | 5 | 27 | 1.16 | 36000 | 26 |
| 32 | | 20 | | | 38 | 0.58 | 40000 | 24 |
| 33 | | 30 | | | 32 | 1.16 | 42000 | 42 |
| 34 | | 30 | | | 26 | 1.16 | 40000 | 34 |
| 35 | | 27 | | | 28 | 1.51 | 39000 | 29 |
| 36 | | 22 | | | 31 | 2.09 | 38000 | 26 |
| 37 | | 28 | | | 29 | 2.32 | 36000 | 35 |
| 38 | | 18 | | | 33 | 2.56 | 47000 | 33 |
| 39 | | 40 | | | 36 | 1.16 | 45000 | 39 |
| 40 | | 20 | | | 29 | 1.16 | 41000 | 42 |
| 41 | | 20 | | | 28 | 1.16 | 39000 | 48 |
| 42 | | 20 | | | 24 | 1.16 | 38000 | 26 |
| 43 | | 20 | MMA | 15 | 25 | 1.16 | 36000 | 19 |
| 44 | | 0 | AS6S | 10 | 72 | 2.85 | 45000 | 24 |
| 45 | | 20 | MMA | 40 | 86 | 1.16 | 41000 | 41 |
| 46 | 25 | 30 | | | 42 | 1.16 | 46000 | 28 |
| 47 | 40 | 45 | | | 21 | 1.16 | 39000 | 36 |
| 48 | 53 | 65 | | | 1 | 1.16 | 42000 | 29 |
| 49 | 42 | 59 | MMA | 6 | −19 | 1.16 | 41000 | 34 |
| 50 | | 20 | | | 35 | 0.49 | 40000 | 27 |
| 51 | | 20 | | | 32 | 0.44 | 38000 | 29 |
| 52 | | 25 | | | 25 | 0 | 39000 | 35 |
| 53 | | 25 | | | 29 | 0.348 | 43000 | 37 |
| 54 | | 25 | | | 26 | 0.116 | 45000 | 15 |
| 55 | | 20 | DMAPAA | 10 | 35 | — | 41000 | 70 |
| 56 | 21 | 48 | | | 26 | 0.58 | 40000 | 26 |
| 57 | 43 | 43 | MMA | 22 | 17 | 1.16 | 38000 | 36 |
| 58 | 48 | 48 | MMA | 17 | 10 | 1.16 | 39000 | 48 |

TABLE 3

| | Aqueous medium | | | Resin particles | | | | | | | | | |
|---|---|---|---|---|---|---|---|---|---|---|---|---|---|
| | | | | | Structural unit of resin | | | | | | | Evaluation result | |
| | | Proportion in aqueous medium (% by mass) | | | Total amount of units (1) to (3) (% by mass) | C2 or more chain alkyl group unit (% by mass) | Acid group unit (% by mass) | Total amount of units (C) to (F) (% by mass) | Total amount of units (1) to (3) and (A) to (F) (% by mass) | Tg of resin (° C.) | Acid value of resin (mmol/g) | | |
| | Imper-meable base material | Type of water-soluble organic solvent | Water-soluble organic solvent | Water | No. | | | | | | | | Adhesive-ness | Streak uneven-ness |
| Example 1 | A | PG | 22 | 78 | 1 | 25 | 0 | 10 | 32 | 90 | 84 | 1.16 | D | A |
| Example 2 | A | PG | 22 | 78 | 2 | 25 | 0 | 10 | 28 | 90 | 67 | 1.16 | D | A |
| Example 3 | A | PG | 22 | 78 | 3 | 25 | 0 | 10 | 25 | 90 | 64 | 1.16 | C | A |
| Example 4 | A | PG | 22 | 78 | 4 | 25 | 0 | 10 | 20 | 90 | 58 | 1.16 | C | A |
| Example 5 | A | PG | 22 | 78 | 5 | 25 | 0 | 10 | 20 | 90 | 52 | 1.16 | B | A |
| Example 6 | A | PG | 22 | 78 | 6 | 25 | 25 | 10 | 25 | 90 | 41 | 1.16 | B | A |
| Example 7 | A | PG | 22 | 78 | 7 | 25 | 0 | 10 | 20 | 90 | 39 | 1.16 | A | C |
| Example 8 | A | PG | 22 | 78 | 8 | 35 | 0 | 10 | 10 | 90 | 27 | 1.16 | A | A |
| Example 9 | A | PG | 22 | 78 | 9 | 25 | 40 | 10 | 40 | 90 | 22 | 1.16 | A | C |
| Example 10 | A | PG | 22 | 78 | 10 | 25 | 50 | 10 | 50 | 90 | 2 | 1.16 | A | C |
| Example 11 | A | PG | 22 | 78 | 11 | 25 | 55 | 10 | 65 | 90 | −4 | 1.16 | B | C |
| Example 12 | A | PG | 22 | 78 | 12 | 25 | 48 | 10 | 48 | 73 | −18 | 1.16 | B | C |
| Example 13 | A | PG | 22 | 78 | 13 | 25 | 50 | 10 | 65 | 90 | −22 | 1.16 | C | C |
| Example 14 | A | PG | 22 | 78 | 14 | 25 | 50 | 10 | 65 | 90 | −27 | 1.16 | C | C |
| Example 15 | A | PG | 22 | 78 | 15 | 25 | 55 | 10 | 65 | 90 | −32 | 1.16 | D | C |

TABLE 3-continued

| | | Aqueous medium | | | Resin particles | | | | | | | Evaluation result | |
|---|---|---|---|---|---|---|---|---|---|---|---|---|---|
| | | | Proportion in aqueous medium (% by mass) | | | Structural unit of resin | | | | | | | |
| | | Type of | | | | Total amount of units (1) to (3) (% by mass) | C2 or more chain alkyl group unit (% by mass) | Acid group unit (% by mass) | Total amount of units (C) to (F) (% by mass) | Total amount of units (1) to (3) and (A) to (F) (% by mass) | Tg of resin (° C.) | Acid value of resin (mmol/g) | |
| | Impermeable base material | water-soluble organic solvent | Water-soluble organic solvent | Water | No. | | | | | | | | Adhesiveness | Streak unevenness |
| Example 16 | A | PG | 22 | 78 | 16 | 25 | 60 | 10 | 65 | 90 | −37 | 1.16 | D | C |
| Comparative Example 1 | A | PG | 22 | 78 | 17 | 25 | 65 | 10 | 65 | 90 | −42 | 1.16 | E | C |
| Example 17 | A | PG | 22 | 78 | 18 | 43 | 25 | 5 | 52 | 95 | 23 | 0.58 | C | C |
| Example 18 | A | PG | 22 | 78 | 19 | 38 | 17 | 5 | 57 | 95 | 28 | 0.58 | B | C |
| Example 19 | A | PG | 22 | 78 | 20 | 33 | 39 | 5 | 62 | 95 | 28 | 0.58 | A | C |
| Example 20 | A | PG | 22 | 78 | 21 | 28 | 47 | 5 | 67 | 95 | 38 | 0.58 | A | C |
| Example 21 | A | PG | 22 | 78 | 22 | 17 | 53 | 5 | 78 | 95 | 33 | 0.58 | A | C |
| Example 22 | A | PG | 22 | 78 | 23 | 13 | 53 | 5 | 82 | 95 | 33 | 0.58 | B | C |
| Example 23 | A | PG | 22 | 78 | 24 | 8 | 62 | 5 | 87 | 95 | 29 | 0.58 | C | C |
| Example 24 | A | PG | 22 | 78 | 25 | 3 | 62 | 5 | 92 | 95 | 26 | 0.58 | D | C |
| Example 25 | A | PG | 22 | 78 | 26 | 25 | 0 | 5 | 0 | 95 | 30 | 0.58 | B | A |
| Example 26 | A | PG | 22 | 78 | 27 | 25 | 3 | 10 | 25 | 90 | 38 | 1.16 | A | A |
| Example 27 | A | PG | 22 | 78 | 28 | 25 | 7 | 10 | 29 | 90 | 36 | 1.16 | A | C |
| Example 28 | A | PG | 22 | 78 | 29 | 25 | 0 | 10 | 10 | 90 | 36 | 1.16 | A | B |
| Example 29 | A | PG | 22 | 78 | 30 | 25 | 0 | 10 | 30 | 75 | 37 | 1.16 | B | A |
| Example 30 | A | PG | 22 | 78 | 31 | 25 | 0 | 10 | 30 | 85 | 27 | 1.16 | B | A |
| Example 31 | A | PG | 22 | 78 | 32 | 20 | 0 | 5 | 20 | 95 | 38 | 0.58 | B | A |
| Example 32 | A | PG | 22 | 78 | 33 | 25 | 0 | 10 | 30 | 90 | 32 | 1.16 | A | A |
| Example 33 | A | PG | 22 | 78 | 34 | 25 | 0 | 10 | 30 | 90 | 26 | 1.16 | A | A |
| Example 34 | A | PG | 22 | 78 | 35 | 25 | 0 | 13 | 27 | 87 | 28 | 1.51 | A | A |
| Example 35 | A | PG | 22 | 78 | 36 | 25 | 0 | 18 | 22 | 82 | 31 | 2.09 | B | A |
| Example 36 | A | PG | 22 | 78 | 37 | 25 | 0 | 20 | 28 | 90 | 29 | 2.32 | C | A |
| Example 37 | A | PG | 22 | 78 | 38 | 25 | 0 | 22 | 18 | 78 | 33 | 2.56 | D | A |
| Comparative Example 2 | A | GP250 | 5 | 95 | 7 | 25 | 0 | 10 | 20 | 90 | 39 | 1.16 | E | A |
| Example 38 | A | GP250 | 1 | 99 | 7 | 25 | 0 | 10 | 20 | 90 | 39 | 1.16 | A | A |
| Example 39 | A | PG | 22 | 78 | 39 | 35 | 0 | 10 | 15 | 90 | 28 | 1.16 | A | A |
| Example 40 | A | PG | 22 | 78 | 40 | 35 | 0 | 10 | 20 | 90 | 29 | 1.16 | A | A |
| Example 41 | A | PG | 22 | 78 | 41 | 35 | 0 | 10 | 20 | 90 | 28 | 1.16 | A | A |
| Example 42 | A | PG | 22 | 78 | 42 | 35 | 0 | 10 | 20 | 90 | 24 | 1.16 | A | A |
| Example 43 | A | PG | 22 | 78 | 43 | 25 | 0 | 10 | 20 | 75 | 25 | 1.16 | A | A |
| Example 44 | B | PG | 22 | 78 | 7 | 35 | 0 | 10 | 20 | 90 | 27 | 1.16 | A | A |
| Example 45 | C | PG | 22 | 78 | 7 | 35 | 0 | 10 | 20 | 90 | 27 | 1.16 | A | A |
| Example 46 | D | PG | 22 | 78 | 7 | 35 | 0 | 10 | 20 | 90 | 27 | 1.16 | A | A |
| Comparative Example 3 | A | PG | 20 | 80 | 44 | 20 | 0 | 24.5 | 0 | 66 | 72 | 2.85 | E | A |
| Comparative Example 4 | A | PG | 22 | 78 | 45 | 0 | 0 | 10 | 20 | 50 | 86 | 1.16 | E | A |
| Example 47 | A | PG | 22 | 78 | 46 | 25 | 25 | 10 | 30 | 90 | 42 | 1.16 | B | C |
| Example 48 | A | PG | 22 | 78 | 47 | 25 | 40 | 10 | 45 | 90 | 21 | 1.16 | A | C |
| Example 49 | A | PG | 22 | 78 | 48 | 25 | 53 | 10 | 65 | 90 | 1 | 1.16 | A | C |
| Example 50 | A | PG | 22 | 78 | 49 | 25 | 42 | 10 | 59 | 84 | −19 | 1.16 | B | C |
| Example 51 | A | PG | 22 | 78 | 50 | 25 | 0 | 10 | 20 | 90 | 35 | 0.49 | A | A |
| Example 52 | A | PG | 22 | 78 | 51 | 25 | 0 | 10 | 20 | 90 | 32 | 0.44 | A | A |
| Comparative Example 5 | A | PG | 22 | 78 | 52 | 25 | 0 | 0 | 25 | 100 | 25 | 0 | A | D |
| Example 53 | A | PG | 22 | 78 | 53 | 25 | 0 | 3 | 25 | 97 | 29 | 0.35 | A | B |
| Example 54 | A | PG | 22 | 78 | 54 | 25 | 0 | 1 | 25 | 99 | 26 | 0.12 | A | C |
| Comparative Example 6 | A | PG | 22 | 78 | 55 | 25 | 0 | 0 | 20 | 90 | 35 | 0 | A | D |
| Example 55 | A | PG | 22 | 78 | 56 | 47 | 21 | 5 | 48 | 95 | 26 | 0.58 | D | C |
| Example 56 | A | PG | 22 | 78 | 57 | 25 | 43 | 10 | 43 | 68 | 17 | 1.16 | B | C |
| Example 57 | A | PG | 22 | 78 | 58 | 25 | 48 | 10 | 48 | 73 | 10 | 1.16 | A | C |

As listed in Tables 1 to 3, in each example in which an ink containing an aqueous medium and specific resin particles, in which the Tg of the specific resin of the specific resin particles was −40° C. or higher and 85° C. or lower, the specific resin had at least one selected from the group consisting of units (1) to (3) and at least one of an acid group or a salt of the acid group, the acid value of the specific resin was 0.10 mmol/g or greater and 2.65 mmol/g or less, and the proportion of the water-soluble organic solvent having a boiling point of 250° C. or higher in the aqueous medium was 3% by mass or less was used, the adhesiveness of the image to the impermeable base material was excellent and the streak unevenness of the image was suppressed.

In all Comparative Example 1 in which the Tg of the resin in the ink was lower than −40° C., Comparative Example 2 in which the proportion of the water-soluble organic solvent having a boiling point of 250° C. or higher in the aqueous medium was greater than 3% by mass, Comparative Example 3 in which the acid value of the resin in the ink was greater than 2.65 mmol/g, and Comparative Example 4 in which the resin in the ink did not have the units (1) to (3), the adhesiveness of the image to the impermeable base material was degraded as compared with each example.

Further, in Comparative Examples 5 and 6 in which the acid value of the resin in the ink was less than 0.10 mmol/g, the streak unevenness of the image was significant. Specifically, the resin in Comparative Example 5 is a resin that does not contain an acid group nor a salt of the acid group and does not contain a cationic group, and the resin in Comparative Example 6 is a resin that does not contain an acid group nor a salt of the acid group and contains a cationic group.

As shown in the results of Examples 25 and 26, it was found that in a case where the specific resin has at least one selected from the group consisting of the units (C) to (F) (Example 26), the adhesiveness of the image to the impermeable base material is further improved.

As shown in the results of Examples 1 to 16, it was found that in a case where the Tg of the specific resin is −20° C. or higher and 55° C. or lower (Examples 5 to 12), the adhesiveness of the image to the impermeable base material is further improved.

As shown in the results of Examples 26 and 27, it was found that in a case where the content of the structural unit derived from an alkyl (meth)acrylate containing a chain alkyl group having 2 or more carbon atoms in the specific resin is 5% by mass or less with respect to the entirety of the specific resin (Example 26), the streak unevenness of the image is further suppressed.

As shown in the results of Examples 23 and 24, it was found that in a case where the total content of the units (1) to (3) is 5% by mass or greater with respect to the entirety of the specific resin (Example 23), the adhesiveness of the image to the impermeable base material is further improved.

As shown in the results of Examples 53 and 54, it was found that in a case where the acid value of the specific resin is 0.30 mmol/g or greater (Example 53), the streak unevenness of the image is further suppressed.

As shown in the results of Examples 56 and 57, it was found that in a case where the total content of the units (1) to (3) and (A) to (F) is 70% by mass or greater with respect to the entirety of the specific resin (Example 57), the adhesiveness of the image is further improved.

As shown in the results of Example 7 (resin particles 7), Example 29 (resin particles 30), Example 30 (resin particles 31), and Example 33 (resin particles 34), it was found that in a case where the specific resin has the unit (2), and $Y^3$ in the unit (2) represents —OH, —NH$_2$, —NR$^3$H, or —NR$^3$R$^4$ (for example, Examples 7 and 33), the adhesiveness of the image is further improved.

As described above, the example group using the black ink as the ink has been described. However, it goes without saying that the same effects as those of the above-described example group can be obtained even in a case where the black ink was changed to an ink other than the black ink (for example, magenta ink, yellow ink, or cyan ink) in the example group or in a case where a polychromic image was recorded using the black ink and at least one ink other than the black ink.

The disclosure of JP2019-136999 filed on Jul. 25, 2019 is incorporated herein by reference in its entirety.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:
1. An ink for an impermeable base material, comprising:
an aqueous medium; and
resin particles,
wherein a resin of the resin particles has a glass transition temperature of −40° C. or higher and 40° C. or lower,
the resin has at least one selected from the group consisting of the following structural unit (1), the following structural unit (2), and the following structural unit (3) and at least one of an acid group or a salt of the acid group,
an acid value of the resin, which is a total number of millimoles of the acid group and the salt of the acid group per 1 g of the resin, is 0.40 mmol/g or greater and 2.65 mmol/g or less,
a content of a structural unit derived from an alkyl (meth)acrylate containing a chain alkyl group having 2 or more carbon atoms in the resin is 5% by mass or less with respect to an entirety of the resin, and
a proportion of a water-soluble organic solvent having a boiling point of 250° C. or higher in the aqueous medium is 3% by mass or less,

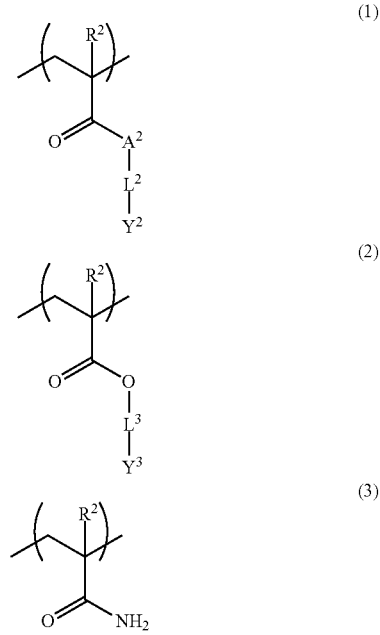

in the structural unit (1) to the structural unit (3), $R^2$ represents a hydrogen atom or an alkyl group having 1 to 4 carbon atoms,
in the structural unit (1),
$A^2$ represents —NH— or —N(L$^4$-Y$^4$)—,
$L^2$ represents a divalent group which is one selected from the first group consisting of an alkylene group, an alkenylene group, an alkynylene group, an arylene group, —O—, —NH—, —N(L$^4$-Y$^4$)—, and —C(=O)—, a divalent group which is obtained by combining two or more selected from the first group, or a single bond, and Y² represents an alkyl group, an alkenyl group, an alkynyl group, an aryl group, a halogen atom, —OH, —OR³, —NH₂, —NR³H, —NR³R⁴, or —C(=O) R³, in the structural unit (2), L³ represents a divalent group which is one selected from the first group or a divalent group which is obtained by combining two or more selected from the first group, and Y³ represents a halogen atom, —OH, —OR³, —NH₂, —NR³H, —NR³R⁴, or —C(=O) R³, in the structural unit (1) and the structural unit (2), L⁴ represents a divalent group which is one selected from the second group consisting of an alkylene group, an alkenylene group, an alkynylene group, an arylene group, —O—, —NH—, and —C(=O)—, a divalent group which is obtained by combining two or more selected from the second group, or a single bond, Y⁴ represents an alkyl group, an alkenyl group, an alkynyl group, an aryl group, a halogen atom, —OH, —OR³, —NH₂, —NR³H, —NR³R⁴, or —C(=O) R³, and R³ and R⁴ each independently represent an alkyl group, an alkenyl group, an alkynyl group, or an aryl group, wherein the resin further has at least one selected from the group consisting of the following structural unit (A), the following structural unit (B), the following structural unit (C), the following structural unit (D), the following structural unit (E), and the following structural unit (F),

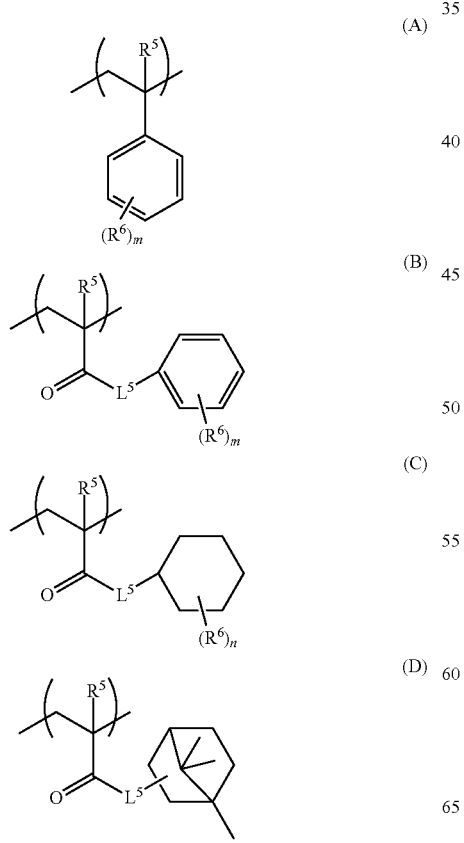

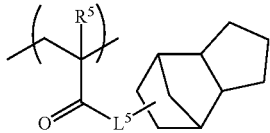

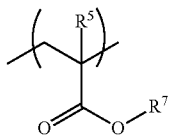

in the structural unit (A) to the structural unit (F), R⁵ represents a hydrogen atom or a methyl group, R⁶ represents an alkyl group, an alkenyl group, or an alkynyl group, R⁷ represents an alkyl group having 2 to 22 carbon atoms, an alkenyl group having 2 to 22 carbon atoms, or an alkynyl group having 2 to 22 carbon atoms, m represents an integer of 0 to 5, n represents an integer of 0 to 11, L⁵ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond, and wherein a total content of the structural unit (1), the structural unit (2), the structural unit (3), the structural unit (A), the structural unit (B), the structural unit (C), the structural unit (D), the structural unit (E), and the structural unit (F) is 70% by mass or greater with respect to an entirety of the resin.

2. The ink for an impermeable base material according to claim 1, wherein the resin has a structural unit containing at least one of the acid group or the salt of the acid group, and the structural unit containing at least one of the acid group or the salt of the acid group is at least one selected from the group consisting of the following structural unit (4), the following structural unit (5), and the following structural unit (6),

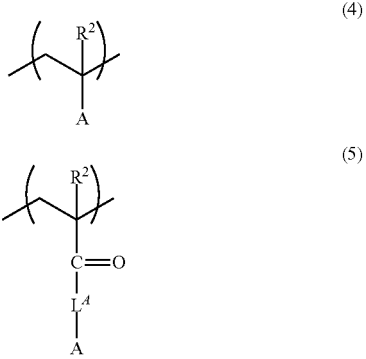

-continued

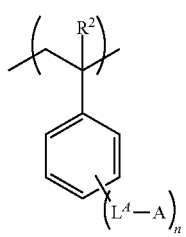

(6)

in the structural unit (4) to the structural unit (6), $R^2$ represents a hydrogen atom or an alkyl group having 1 to 4 carbon atoms, $L^A$ represents a divalent group which is one selected from the third group consisting of an alkylene group having 1 to 30 carbon atoms, an arylene group having 6 to 10 carbon atoms, —O—, —NH—, —S—, —C(=O)—, and —CH(—OH)—, a divalent group which is obtained by combining two or more selected from the third group, or a single bond, A represents an acid group or a salt of the acid group, and n represents an integer of 1 to 5.

3. The ink for an impermeable base material according to claim 1,
wherein the resin has at least one selected from the group consisting of the structural unit (C), the structural unit (D), the structural unit (E), and the structural unit (F).

4. The ink for an impermeable base material according to claim 1,
wherein a total content of the structural unit (1), the structural unit (2), and the structural unit (3) is 5% by mass or greater with respect to an entirety of the resin.

5. The ink for an impermeable base material according to claim 1,
wherein the resin has at least one selected from the group consisting of the structural unit (1) and the structural unit (2).

6. The ink for an impermeable base material according to claim 1,
wherein the resin has the structural unit (2), and
$Y^3$ in the structural unit (2) represents —OH, —$NH_2$, —$NR^3H$, or —$NR^3R^4$.

7. The ink for an impermeable base material according to claim 1,
wherein the ink is an inkjet ink.

8. The ink for an impermeable base material according to claim 1, further comprising:
a colorant.

9. An image recording method comprising:
applying the ink for an impermeable base material according to claim 1 onto an impermeable base material.

10. The ink for an impermeable base material according to claim 1,
wherein a total content of the structural unit (1), the structural unit (2), and the structural unit (3) is 10% by mass or greater with respect to an entirety of the resin.

* * * * *